(12) United States Patent
Clark

(10) Patent No.: US 9,682,430 B2
(45) Date of Patent: Jun. 20, 2017

(54) POCKET HOLE DRILLING MACHINE

(71) Applicant: KREG ENTERPRISES, INC., Huxley, IA (US)

(72) Inventor: Scott L. Clark, Boone, IA (US)

(73) Assignee: Kreg Enterprises, Inc., Huxley, IA (US)

( * ) Notice: Subject to any disclaimer, the term of this patent is extended or adjusted under 35 U.S.C. 154(b) by 282 days.

(21) Appl. No.: 14/300,488

(22) Filed: Jun. 10, 2014

(65) Prior Publication Data

US 2014/0363247 A1 Dec. 11, 2014

Related U.S. Application Data

(60) Provisional application No. 61/833,487, filed on Jun. 11, 2013.

(51) Int. Cl.
| | |
|---|---|
| B23B 41/00 | (2006.01) |
| B23B 47/00 | (2006.01) |
| B23B 47/28 | (2006.01) |
| B23Q 3/18 | (2006.01) |
| B27B 27/00 | (2006.01) |
| B27C 3/02 | (2006.01) |
| B27C 3/08 | (2006.01) |
| B25B 5/08 | (2006.01) |
| B25B 5/06 | (2006.01) |
| B25B 11/00 | (2006.01) |
| B23B 39/00 | (2006.01) |

(52) U.S. Cl.
CPC ............ *B23B 47/00* (2013.01); *B23B 47/288* (2013.01); *B23Q 3/18* (2013.01); *B25B 5/06* (2013.01); *B25B 5/08* (2013.01); *B25B 11/00* (2013.01); *B27B 27/00* (2013.01); *B27C 3/02* (2013.01); *B27C 3/08* (2013.01); *B23B 39/003* (2013.01); *B23B 41/00* (2013.01); *B23B 2247/10* (2013.01); *B23B 2247/12* (2013.01); *Y10T 408/03* (2015.01); *Y10T 408/563* (2015.01)

(58) Field of Classification Search
CPC . B23B 2247/10; B23B 2247/12; B23B 41/00; B23B 41/003; B23B 39/003; Y10T 408/564; Y10T 408/5647; Y10T 408/563; Y10T 408/567
USPC ................ 279/75; 408/110, 111, 103, 115 R
See application file for complete search history.

(56) References Cited

U.S. PATENT DOCUMENTS

| | | | |
|---|---|---|---|
| 1,201,050 A | * 10/1916 | Huff | ................ B25H 1/0042 144/103 |
| 1,285,628 A | 11/1918 | Craley | |
| 1,755,401 A | 4/1930 | Koehl et al. | |

(Continued)

*Primary Examiner* — Daniel Howell
*Assistant Examiner* — Yasir Diab
(74) *Attorney, Agent, or Firm* — Christopher A. Proskey; BrownWinick Law Firm

(57) ABSTRACT

A pocket hole drilling machine is presented. The pocket hole drilling machine has a cabinet made of a molded unitary monolithic piece. A monolithic top plate is connected to the cabinet with an opening in the middle for an insert plate which is positioned therein. A handle extends above the top plated as does a clamping assembly however actuating mechanics of the device move within the cabinet, thereby improving safety by eliminating pinchpoints. An adjustable fence assembly having cam locks connected thereto is also connected to the top plate. This arrangement provides a low cost, safe and efficient pocket hole drilling machine.

23 Claims, 25 Drawing Sheets

(56) References Cited

U.S. PATENT DOCUMENTS

| | | | |
|---|---|---|---|
| 1,982,025 A | 11/1934 | Russell | |
| 1,994,422 A | 3/1935 | Sasek | |
| 2,260,708 A | 10/1941 | French | |
| 2,285,897 A | 6/1942 | Campbell | |
| 2,712,219 A | 7/1955 | Warne | |
| 2,787,301 A | 4/1957 | Anderson | |
| 2,872,957 A | 2/1959 | Eschenburg | |
| 3,451,668 A | 6/1969 | Robinson | |
| 3,452,792 A | 7/1969 | Foreman | |
| 3,737,245 A | 6/1973 | Mater | |
| 3,827,686 A | 8/1974 | Storkh | |
| 3,837,757 A * | 9/1974 | Levine | B23Q 5/10 408/135 |
| 3,994,484 A | 11/1976 | Schorr | |
| 4,062,123 A | 12/1977 | Lundquist | |
| 4,256,000 A | 3/1981 | Seidel | |
| 4,341,375 A * | 7/1982 | Romanin | B25B 1/103 269/153 |
| 4,419,031 A | 12/1983 | Palma | |
| 4,655,649 A * | 4/1987 | Itzov | B25F 5/00 200/553 |
| 4,693,158 A | 9/1987 | Price | |
| 4,747,330 A | 5/1988 | Carithers, Jr. | |
| 4,817,693 A | 4/1989 | Schuler | |
| 4,871,156 A | 10/1989 | Kozyrski et al. | |
| 4,887,653 A | 12/1989 | Thomas | |
| 5,018,562 A | 5/1991 | Adams | |
| 5,038,486 A | 8/1991 | Ducate, Sr. | |
| 5,063,983 A | 11/1991 | Barry | |
| 5,097,555 A | 3/1992 | Dwyer | |
| 5,155,556 A | 10/1992 | Foanio | |
| 5,156,508 A | 10/1992 | Grisley | |
| 5,161,445 A | 11/1992 | Kozyrski et al. | |
| 5,337,641 A | 8/1994 | Duginske | |
| 5,388,337 A | 2/1995 | Powers, II | |
| 5,443,554 A | 8/1995 | Robert | |
| 5,490,665 A | 2/1996 | Thele et al. | |
| 5,553,644 A | 9/1996 | Adams | |
| 5,553,645 A * | 9/1996 | Durney | B27C 5/06 144/134.1 |
| 5,608,970 A | 3/1997 | Owen | |
| 5,617,909 A | 4/1997 | Duginske | |
| 5,662,019 A | 9/1997 | Denman | |
| 5,695,178 A | 12/1997 | Lenzkes | |
| 5,716,045 A | 2/1998 | Taylor | |
| 5,720,096 A | 2/1998 | Dorsey | |
| 5,765,273 A | 6/1998 | Mora et al. | |
| 5,768,966 A | 6/1998 | Duginske | |
| 5,769,574 A | 6/1998 | Feinsod | |
| 5,836,365 A | 11/1998 | Derecktor | |
| 5,845,555 A | 12/1998 | Dawley | |
| 5,890,524 A | 4/1999 | Tucker et al. | |
| 5,979,283 A | 11/1999 | Osborne | |
| 6,061,921 A | 5/2000 | Adams et al. | |
| 6,189,429 B1 | 2/2001 | Liu | |
| 6,250,190 B1 | 6/2001 | Ceroll et al. | |
| 6,484,614 B1 | 11/2002 | Huang | |
| 6,547,311 B1 | 4/2003 | Derecktor | |
| 6,557,601 B1 | 5/2003 | Taylor | |
| 6,599,064 B1 | 7/2003 | Robinson | |
| 6,851,243 B1 | 2/2005 | Sandford | |
| 6,851,345 B1 | 2/2005 | Kennelly et al. | |
| 6,880,442 B2 | 4/2005 | Duginske | |
| 6,955,508 B1 | 10/2005 | Radcliffe | |
| 7,036,540 B2 | 5/2006 | Welsh et al. | |
| 7,226,257 B2 | 6/2007 | Lowder et al. | |
| 7,374,373 B2 | 5/2008 | Park | |
| 7,464,737 B2 | 12/2008 | Duginske | |
| 7,543,661 B2 | 6/2009 | Griffo et al. | |
| 7,591,616 B1 | 9/2009 | Kerner | |
| 7,930,960 B2 | 4/2011 | Duginske | |
| 8,181,680 B1 | 5/2012 | Clark | |
| 8,840,345 B1 | 9/2014 | Park | |
| 2001/0042429 A1 | 11/2001 | Brunson et al. | |
| 2002/0150434 A1 | 10/2002 | Sommerfeld et al. | |
| 2002/0194971 A1 | 12/2002 | Park et al. | |
| 2003/0123941 A1 * | 7/2003 | Emerson | B23B 47/28 408/103 |
| 2003/0145705 A1 | 8/2003 | Miller | |
| 2003/0230180 A1 | 12/2003 | Hines | |
| 2004/0164503 A1 * | 8/2004 | Fan-Chiang | B25B 15/001 279/75 |
| 2005/0139056 A1 | 6/2005 | Gass et al. | |
| 2007/0280795 A1 | 12/2007 | McDaniel et al. | |
| 2008/0219788 A1 | 9/2008 | Sommerfeld et al. | |
| 2009/0053002 A1 | 2/2009 | Kirby | |

* cited by examiner

POCKET HOLE DRILLING MACHINE

CROSS REFERENCE TO RELATED APPLICATION

This application claims the benefit of U.S. Provisional Application No. 61/833,487 filed Jun. 11, 2013.

FIELD OF THE INVENTION

This invention relates to pocket holes. More specifically, and without limitation, this invention relates to a pocket hole drilling machine.

BACKGROUND OF INVENTION

There are many types of machines in use today for drilling holes such as dowel holes, pocket holes, and so forth, in various types of workpieces. Pocket hole wood joinery involves joining boards by inserting a fastener at an angle through the edge of one board into the other. Such joints are commonly used for face frames, cabinet boxes, leg-to-rail joinery in chairs and tables, and so forth. Drill guides, jigs, and pocket hole boring machines are used to drill the holes through which the fasteners or pocket screws are inserted into the adjoining workpiece.

Conventional devices utilize a two-step process to manually clamp and then drill. Such a process is inconvenient and time-consuming. Additionally, such clamps do not readily accommodate various material thicknesses. Other devices utilize a one-step process, but require an expensive pneumatic air cylinder with a clamp pad to facilitate clamping. The use of pneumatics further requires a source of air, i.e., an air compressor, which adds to the inconvenience and expense of these systems.

In addition, while there are previous pocket hole drilling machines, these machines are expensive and have unnecessarily complicated and un-ergonomic designs. These machines also have moving parts exterior to the cabinet and they also lack desirable features.

For the reasons stated above, and for other reasons stated below which will become apparent to those skilled in the art upon reading and understanding the specification and reviewing the drawings, there is a need in the art for an improved drilling system.

Thus it is a primary object of the invention to provide a pocket hole drilling machine that improves upon the state of the art.

Another object of the invention is to provide a pocket hole drilling machine that is inexpensive.

Yet another object of the invention is to provide a pocket hole drilling machine that has an ergonomic design.

Another object of the invention is to provide a pocket hole drilling machine that has a minimum number of parts.

Yet another object of the invention is to provide a pocket hole drilling machine that has an intuitive design.

Another object of the invention is to provide a pocket hole drilling machine that is safer to operate than prior machines.

Yet another object of the invention is to provide a pocket hole drilling machine that has a minimum number of moving parts exterior to the cabinet.

Another object of the invention is to provide a pocket hole drilling machine that is efficient to use.

Yet another object of the invention is to provide a pocket hole drilling machine that is rugged and durable.

Another object of the invention is to provide a pocket hole drilling machine that is allows for quick change-out of drill bits.

Yet another object of the invention is to provide a pocket hole drilling machine that allows the handle to be locked in a storage position.

Another object of the invention is to provide a pocket hole drilling machine that is easily used on workpieces of various thicknesses.

SUMMARY OF THE INVENTION

A pocket hole drilling machine is presented. The pocket hole drilling machine has a cabinet made of a molded unitary monolithic piece. A monolithic top plate is connected to the cabinet with an opening in the middle for an insert plate which is positioned therein. A handle extends above the top plated as does a clamping assembly however actuating mechanics of the device move within the cabinet, thereby improving safety by eliminating pinchpoints. An adjustable fence assembly having cam locks connected thereto is also connected to the top plate. This arrangement provides a low cost, safe and efficient pocket hole drilling machine.

DETAILED DESCRIPTION OF THE INVENTION

Figure 1:
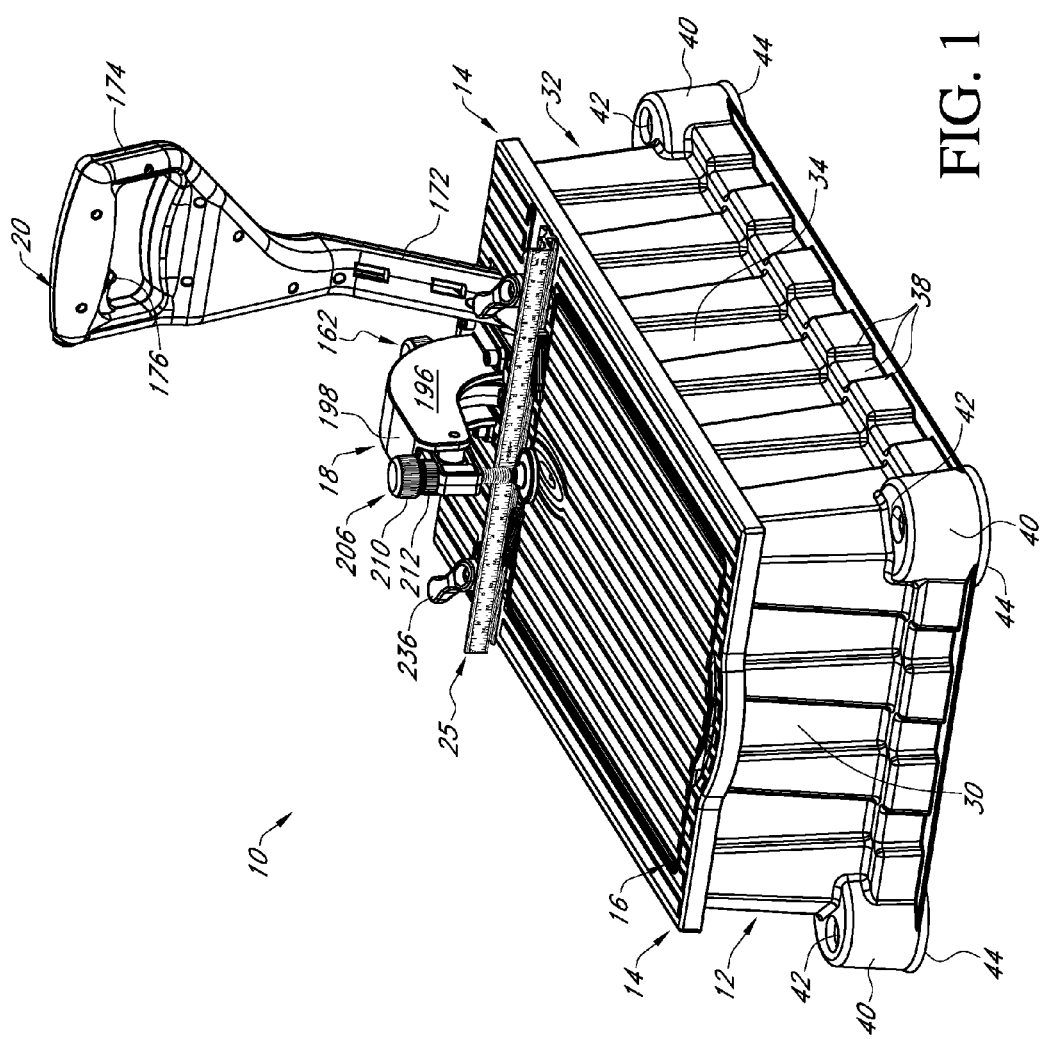
FIG. 1 is a perspective view of the pocket hole drilling machine, showing the cabinet, the top plate, the insert plate, the clamping assembly, the handle and actuating assembly and the fence assembly.
Figure 2:
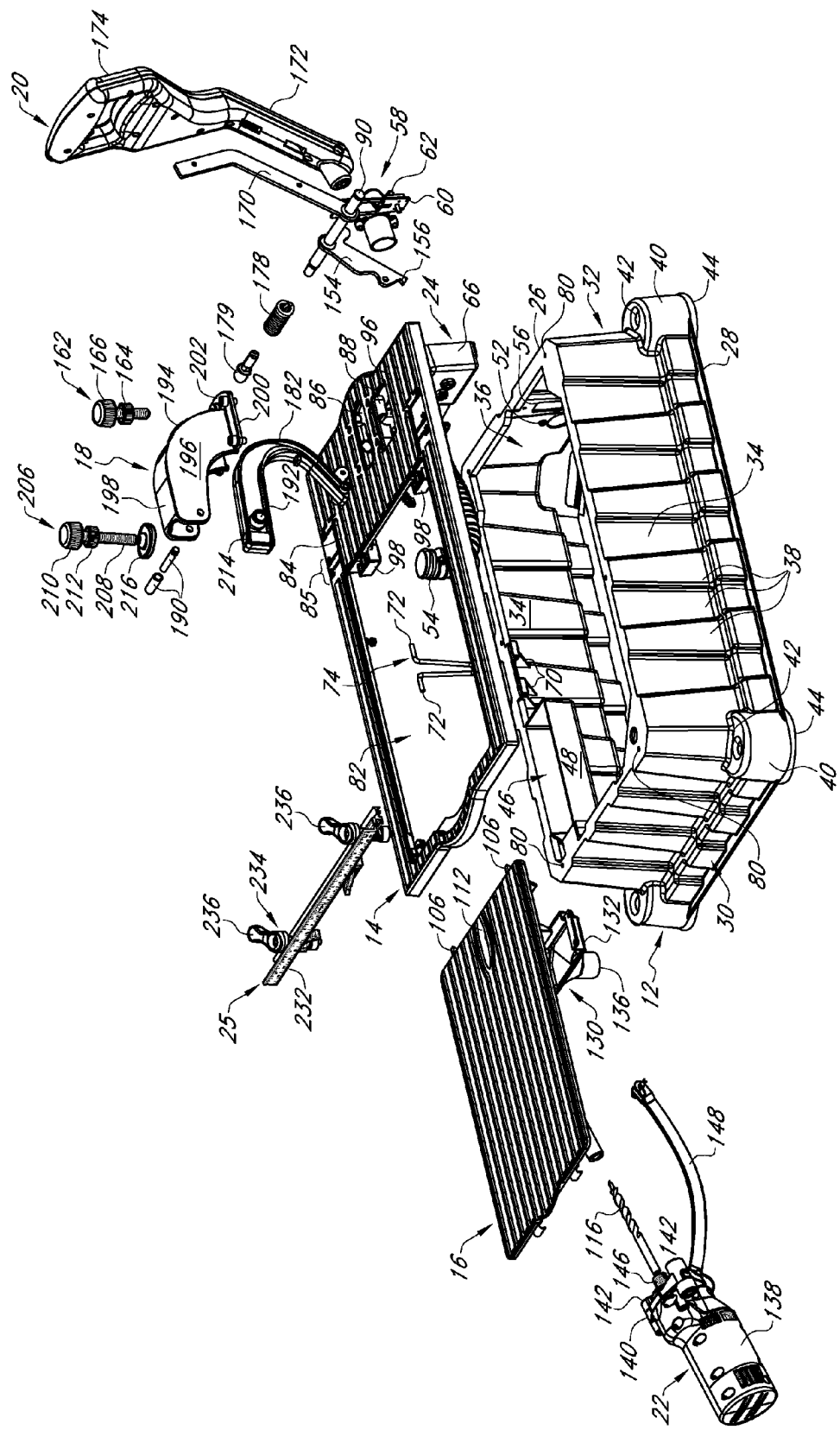
FIG. 2 is an exploded perspective view of the pocket hole drilling machine, showing the cabinet, the top plate, the insert plate, the clamping assembly, the handle and actuating assembly, the fence assembly and the drilling assembly, among other parts and features.
Figure 3:
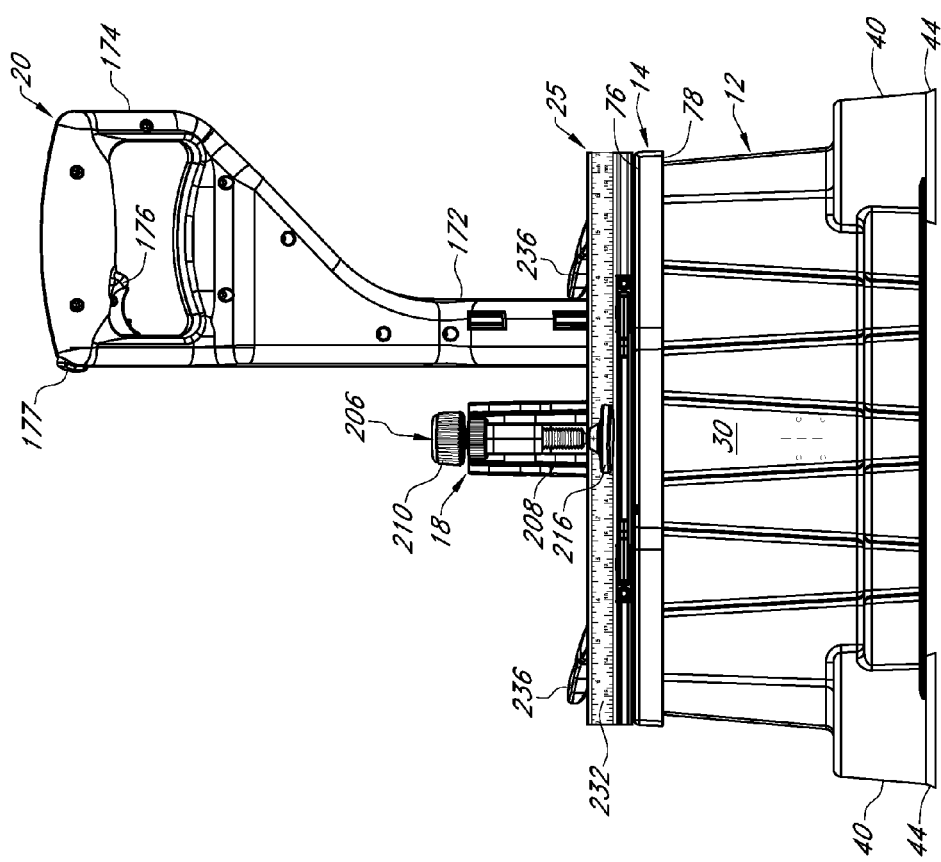
FIG. 3 is a front elevation view of the pocket hole drilling machine, showing the cabinet, the top plate, the clamping assembly, the handle and actuating assembly and the fence assembly.
Figure 4:
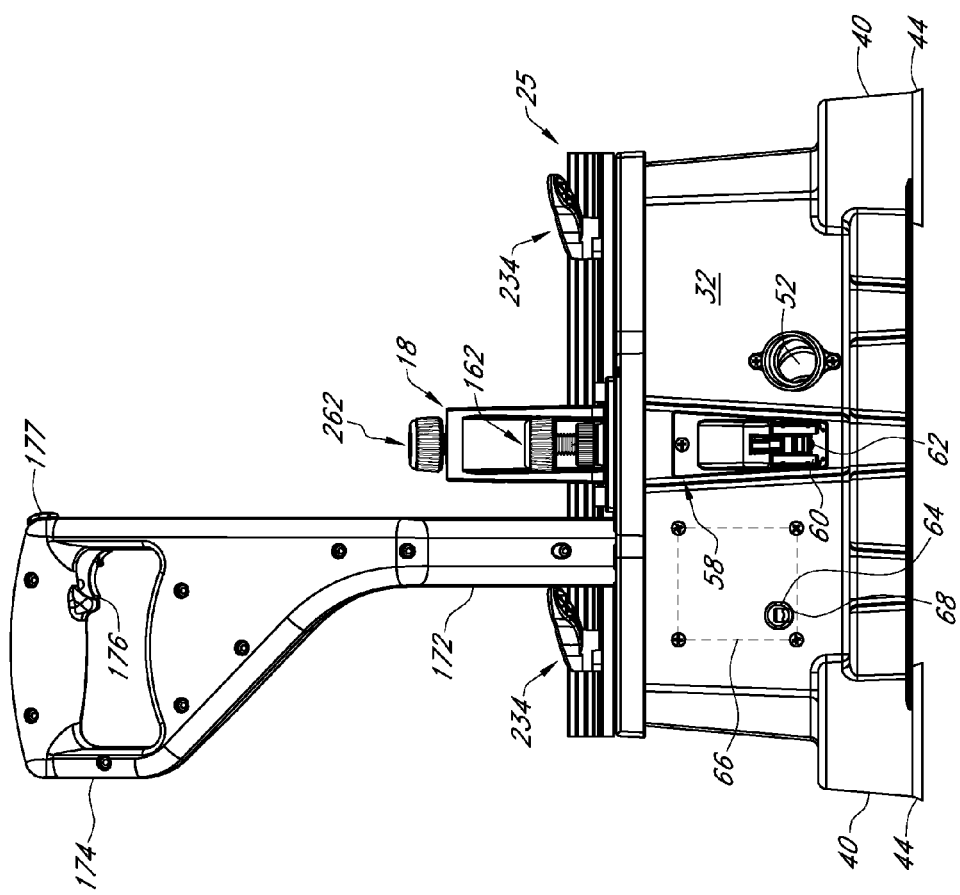
FIG. 4 is a rear elevation view of the pocket hole drilling machine, showing the cabinet, the top plate, the clamping assembly, the handle and actuating assembly and the fence assembly; also seen in this view is the junction box assembly, the lock opening and lock mechanism and the vacuum conduit.
Figure 5:
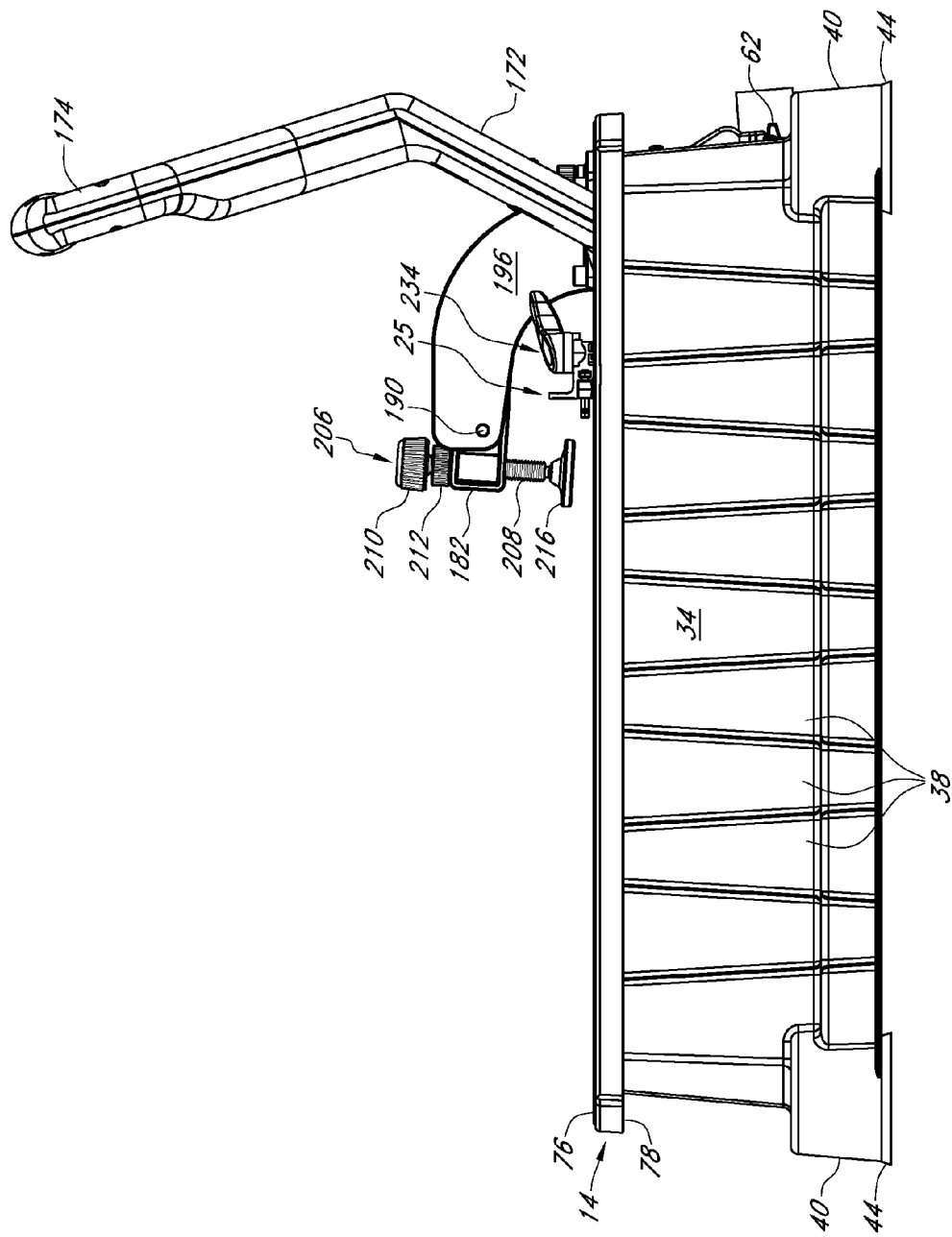
FIG. 5 is a side elevation view of the pocket hole drilling machine, showing the cabinet, the top plate, the clamping assembly, the handle and actuating assembly and the fence assembly.
Figure 6:
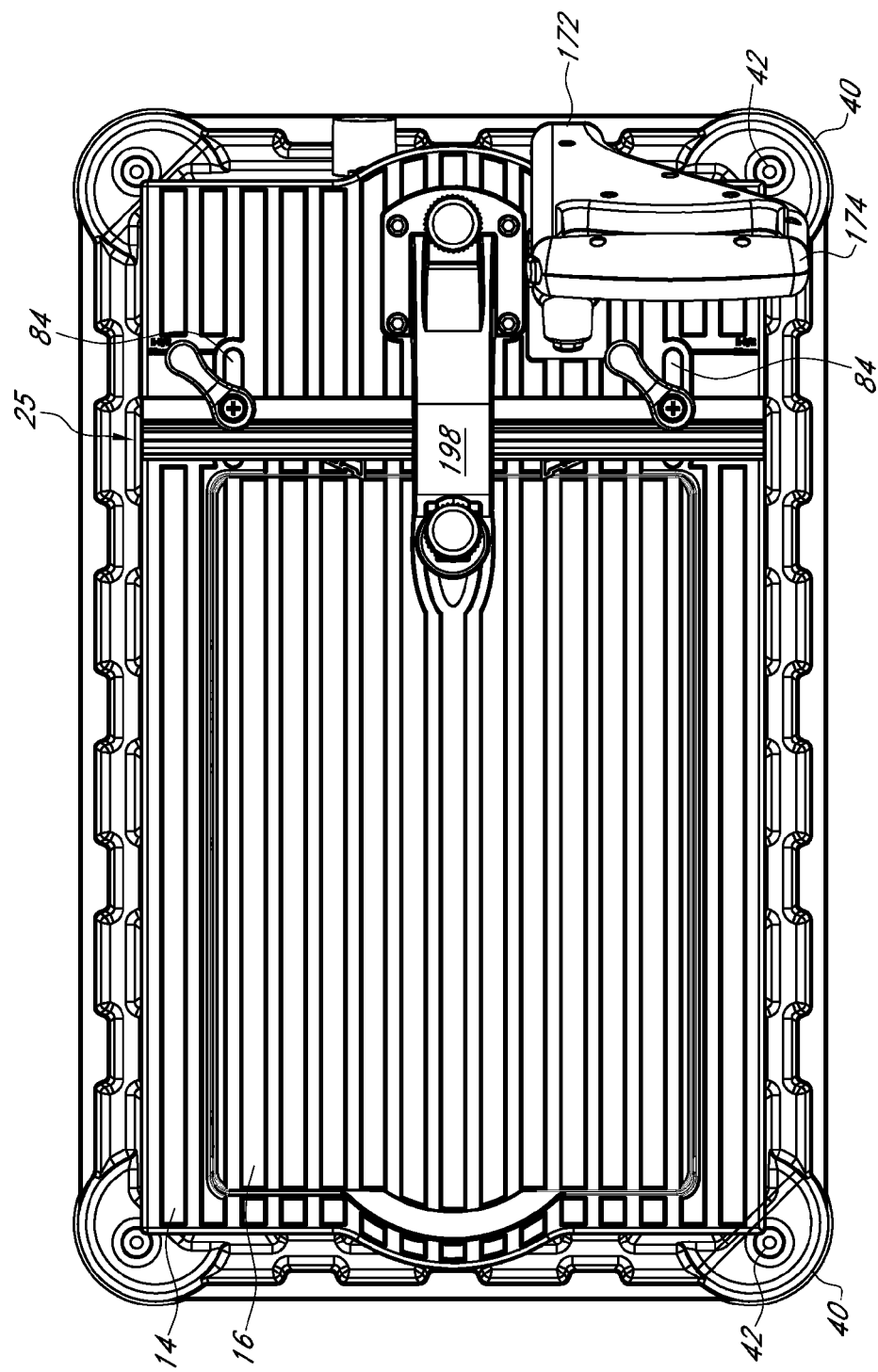
FIG. 6 is a top elevation view of the pocket hole drilling machine, showing the cabinet, the top plate, the insert plate, the clamping assembly, the handle and actuating assembly and the fence assembly.
Figure 7:
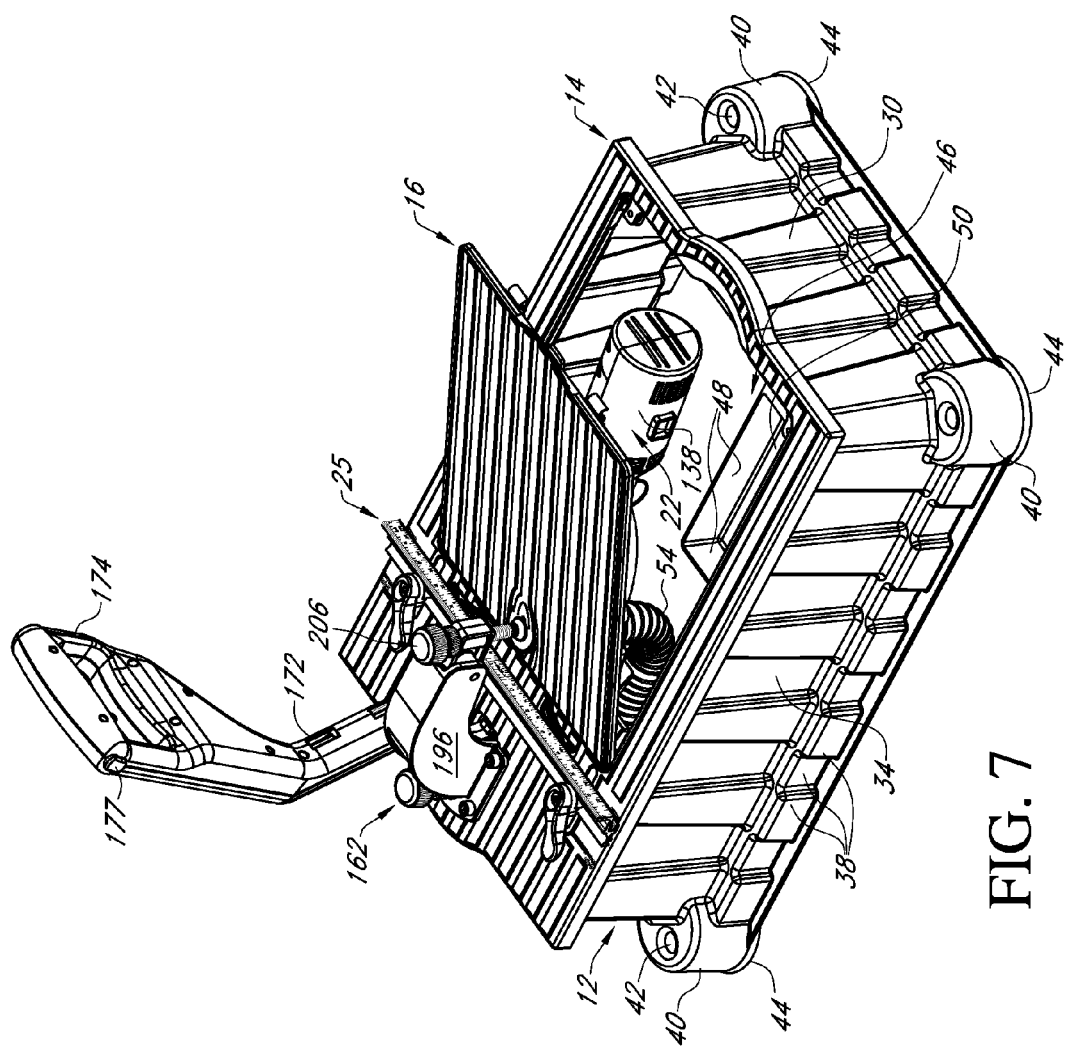
FIG. 7 is a perspective view of the pocket hole drilling machine, showing the insert plate tilted upwardly with respect to the top plate, and the drill motor tilting with the insert plate; also viewable is the storage compartment.
Figure 8:
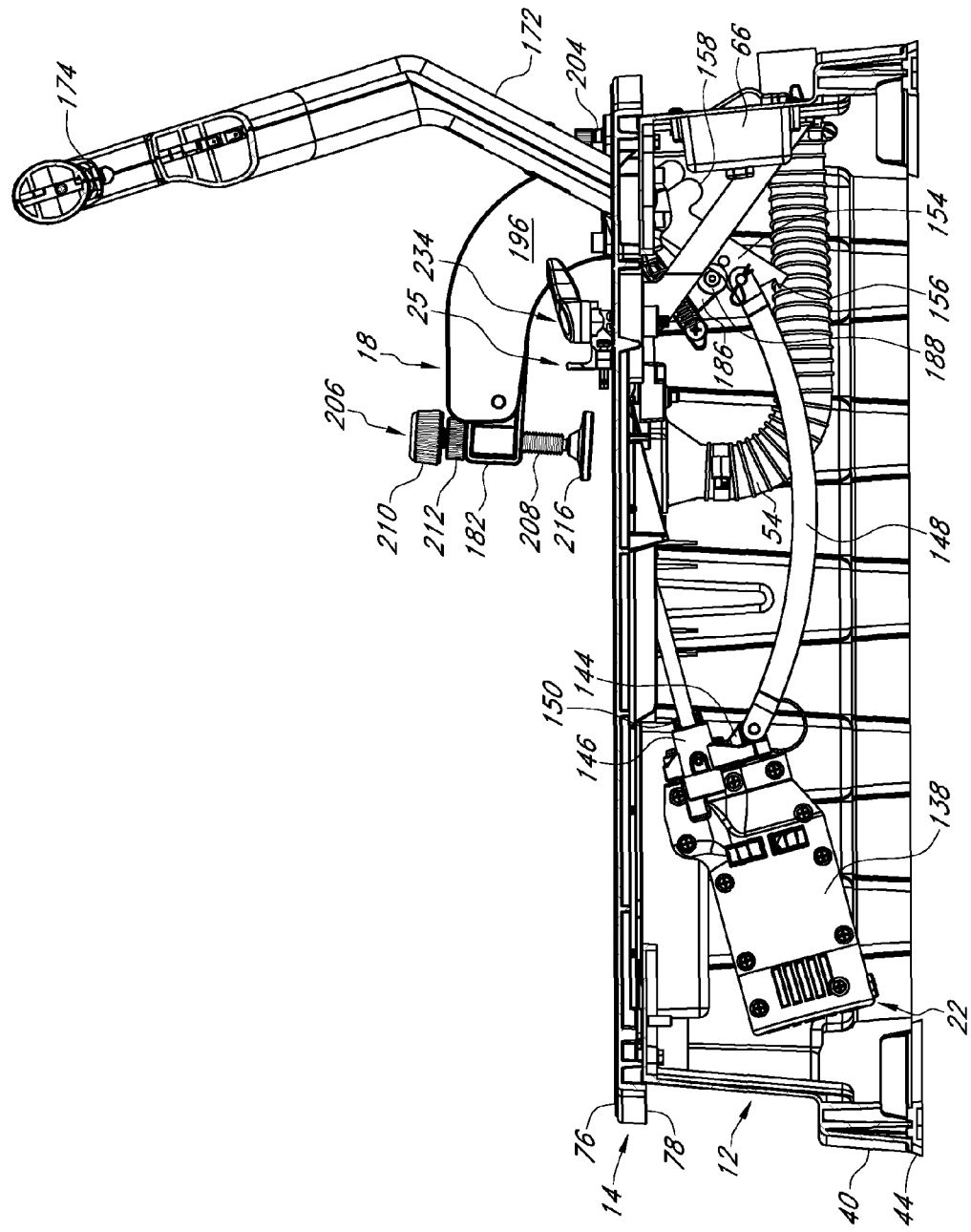
FIG. 8 is a side elevation cut-away view of the pocket hole drilling machine, showing the cabinet, the top plate, the clamping assembly, the handle and actuating assembly, the fence assembly and the drilling assembly; also viewable is the axis of rotation of the actuating mechanism.
Figure 9:
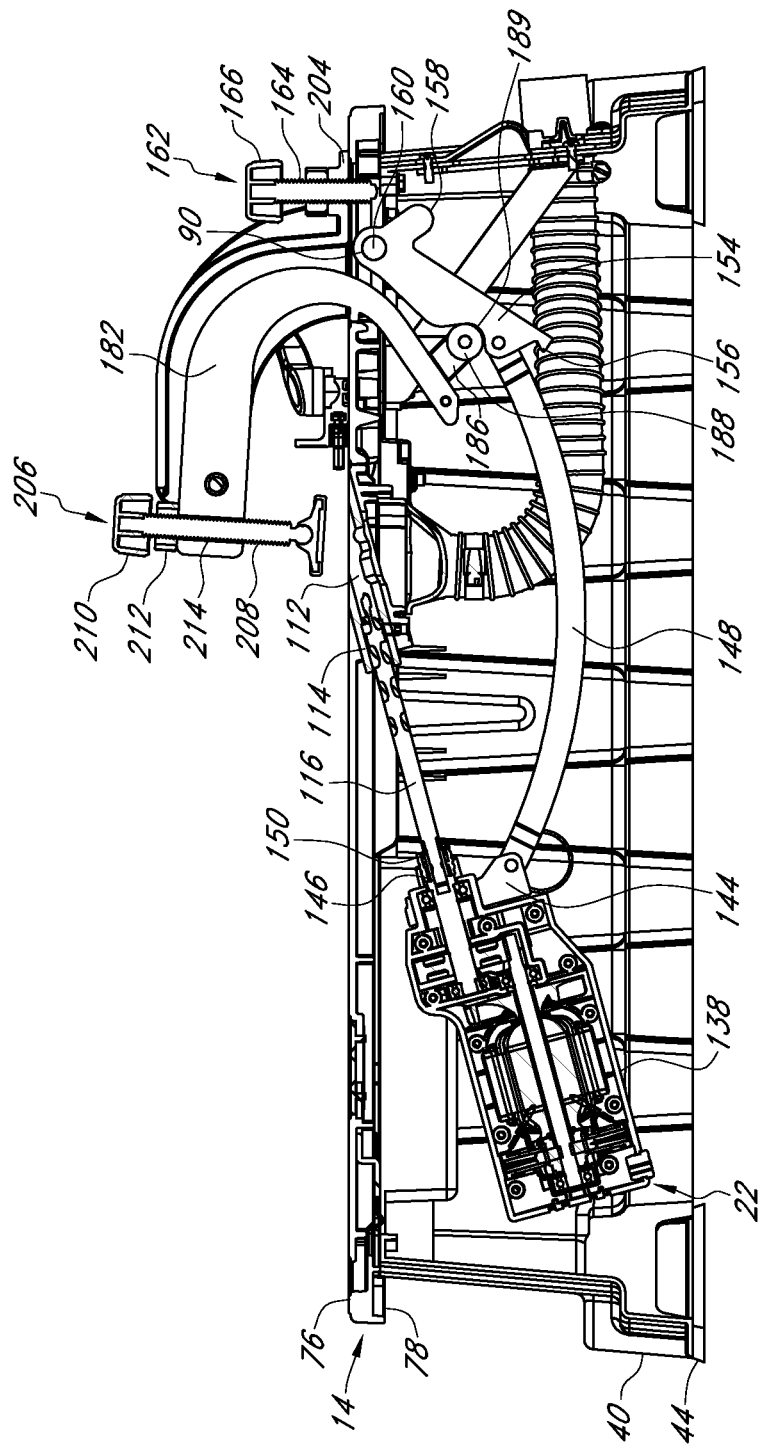
FIG. 9 is a second side elevation cut-away view of the pocket hole drilling machine which is similar to FIG. 8, however this cut is further inward into the cabinet and is made along the plane of the actuating bracket and related parts, the showing the cabinet, the top plate, the clamping assembly, the handle and actuating assembly and the fence assembly; the also viewable is the axis of rotation of the actuating mechanism, the stop arm, the bearing tab, the rotatable bearing as well as components of the drill motor including the quick release chuck and sliding collar.
Figure 10:
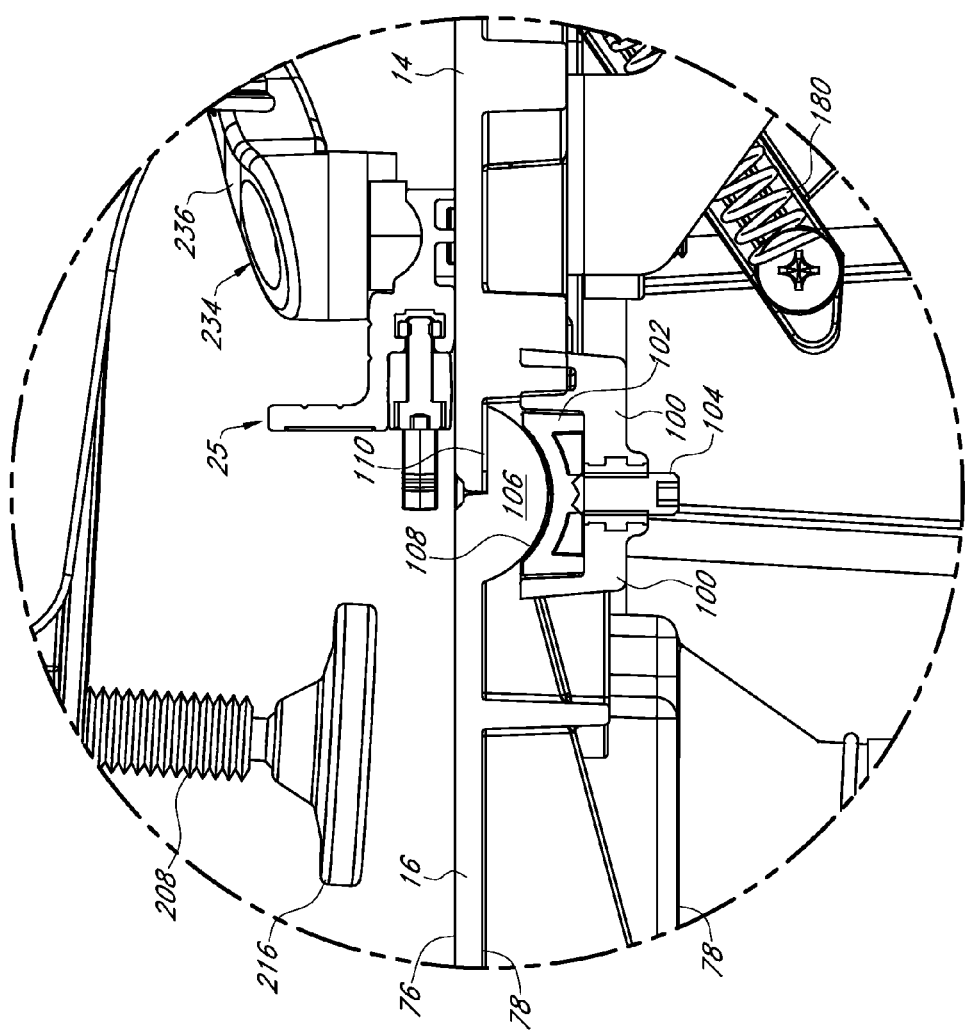
FIG. 10 is a side elevation cut-away view of the joint between the top plate and the insert plate, including the socket, cradle and Woodruff Key portion of the insert plate that is received by the socket and cradle, also viewable is the adjustment member, this view shows the joint in a flat and fully engaged position.
Figure 11:
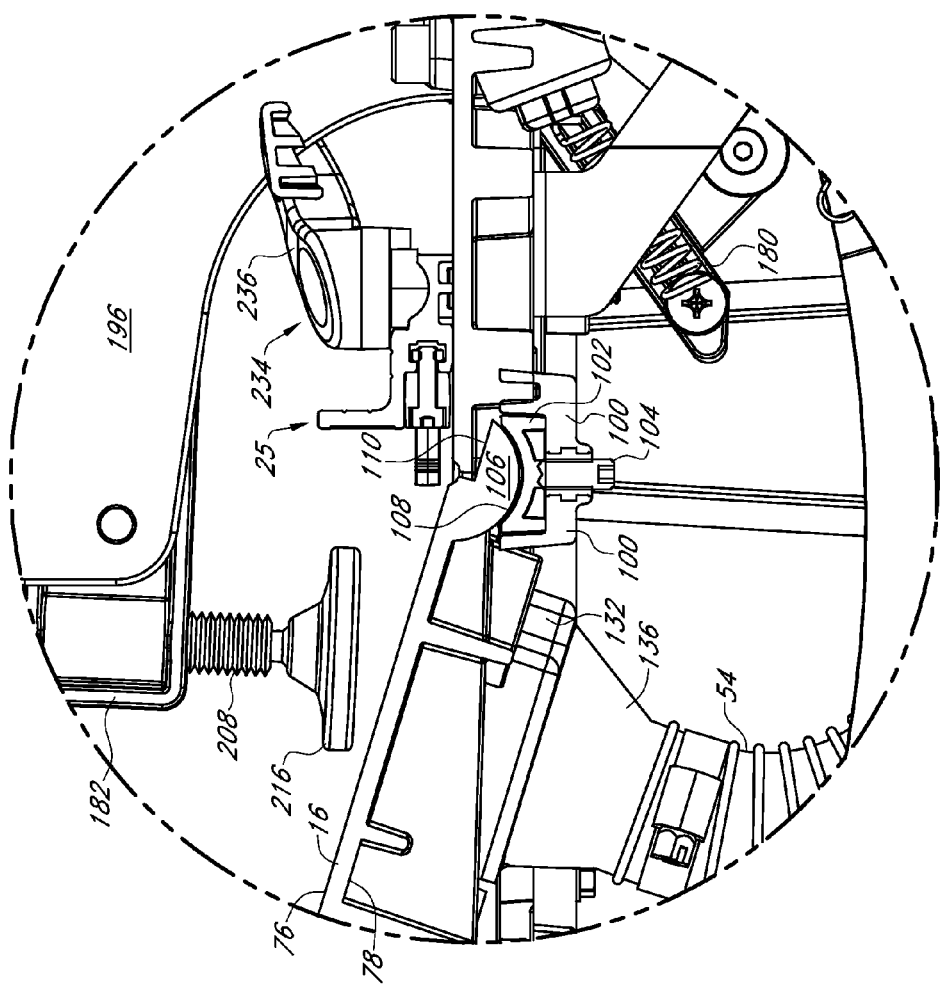
FIG. 11 is the same view as FIG. 10 with the top plate in a tilted position.
Figure 12:
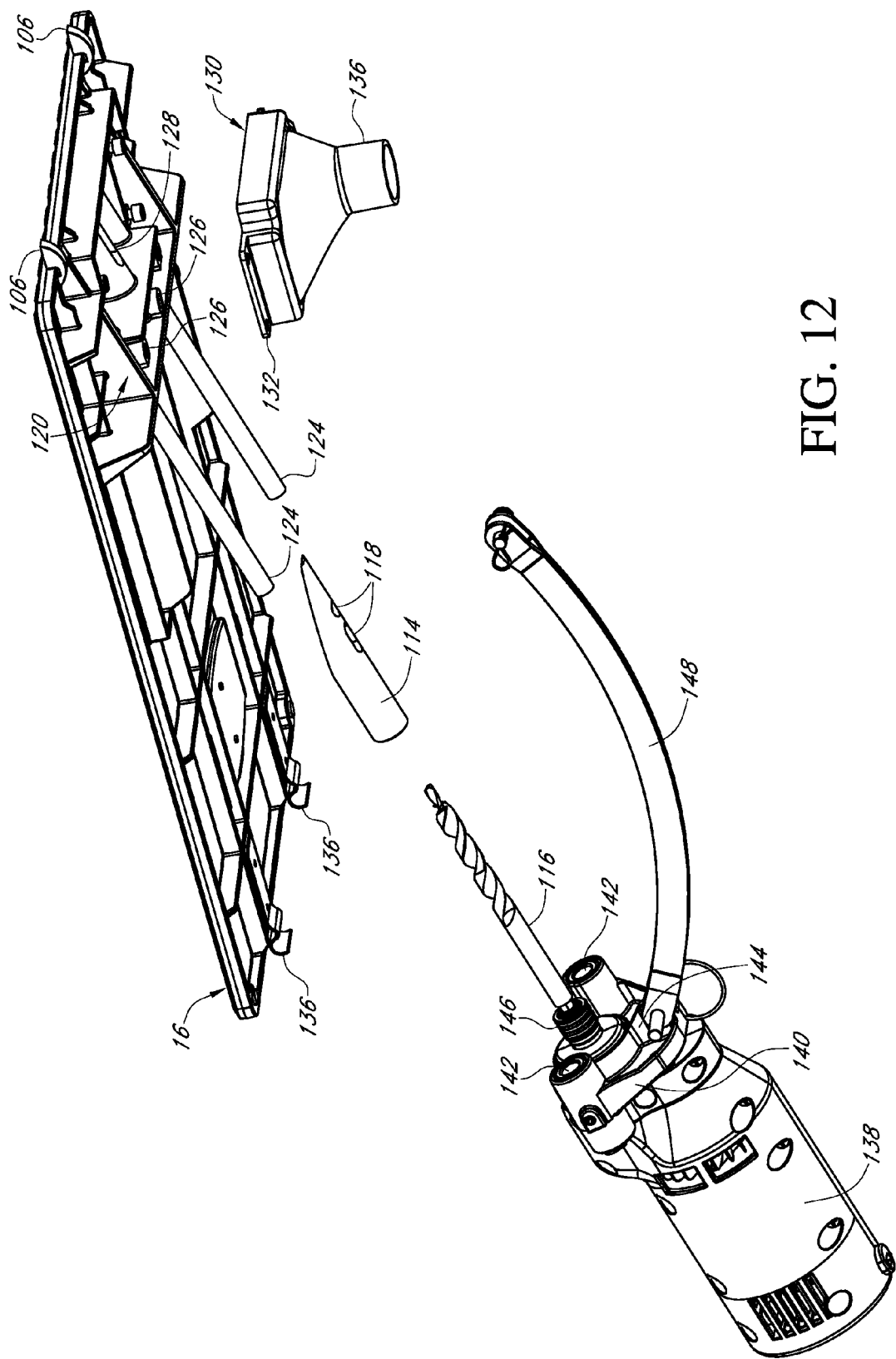
FIG. 12 is an exploded perspective view of the bottom of the insert plate, the guide block, the removable drill bit guide, the guide rods and the dust collection assembly.
Figure 13:
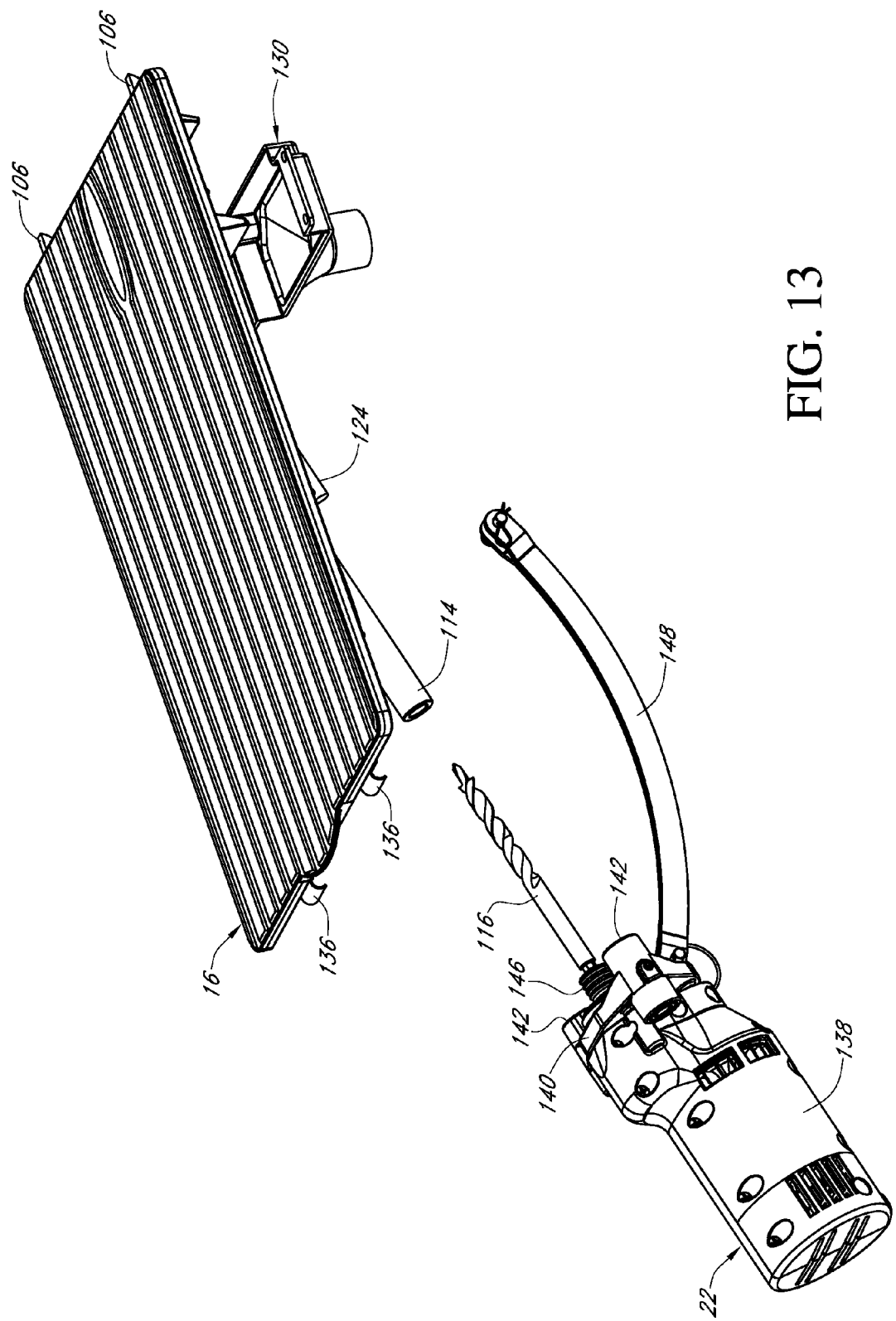
FIG. 13 is the same exploded arrangement of FIG. 12, from the top of the insert plate.
Figure 14:
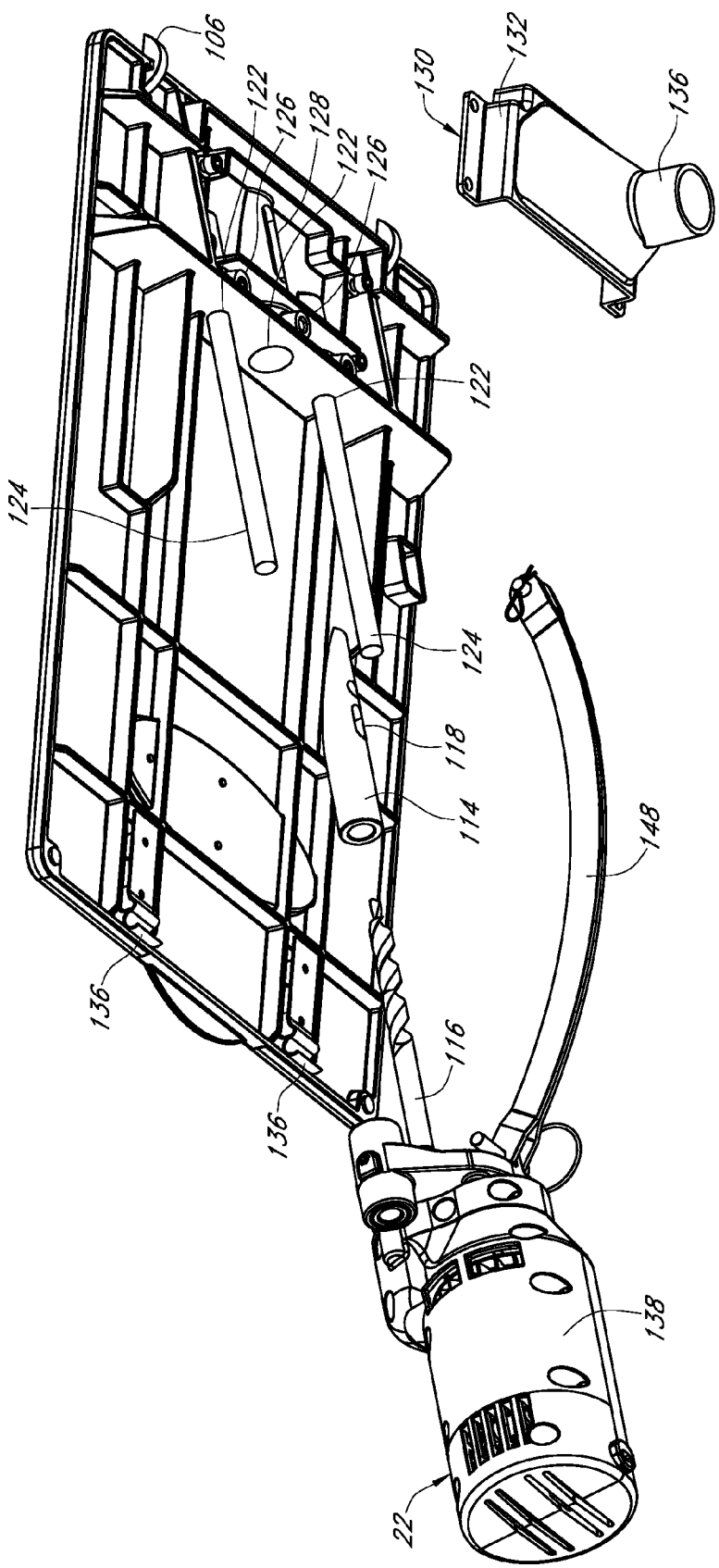
FIG. 14 is the same exploded arrangement of FIGS. 12 and 13, from yet another angle.
Figure 16:
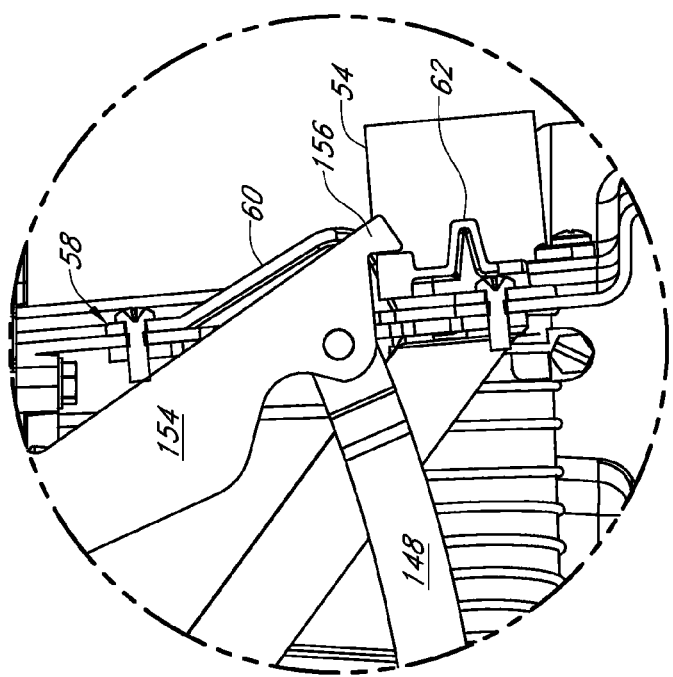
FIG. 16 is a side elevation cut-away view of the view shown in FIG. 15, the view showing the lock opening with the locking mechanism in a locked state with the lock notch of the actuating bracket.
Figure 15:
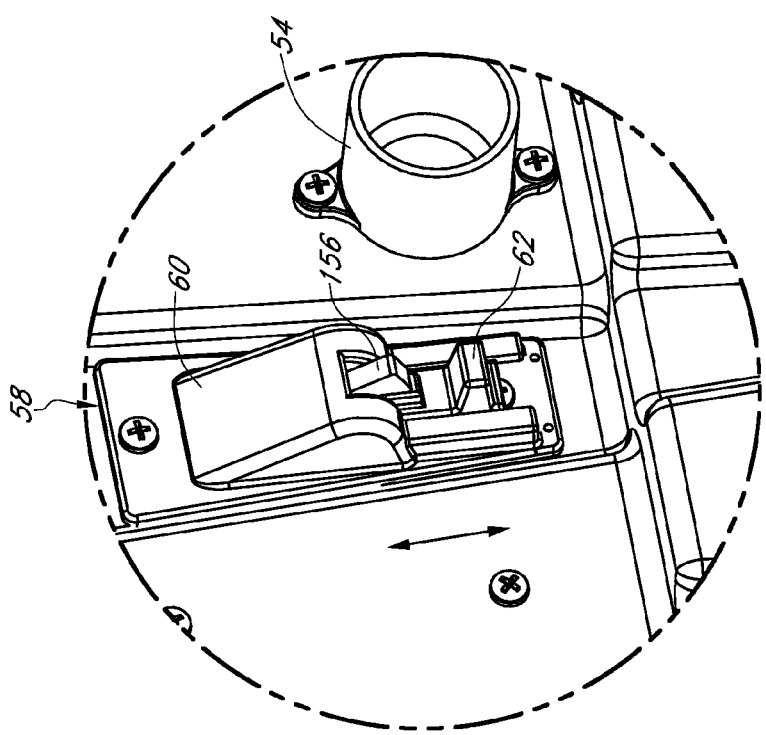
FIG. 15 is a perspective view of the back of the cabinet showing the lock opening with the locking mechanism in a locked state with the lock notch of the actuating bracket.
Figure 17:
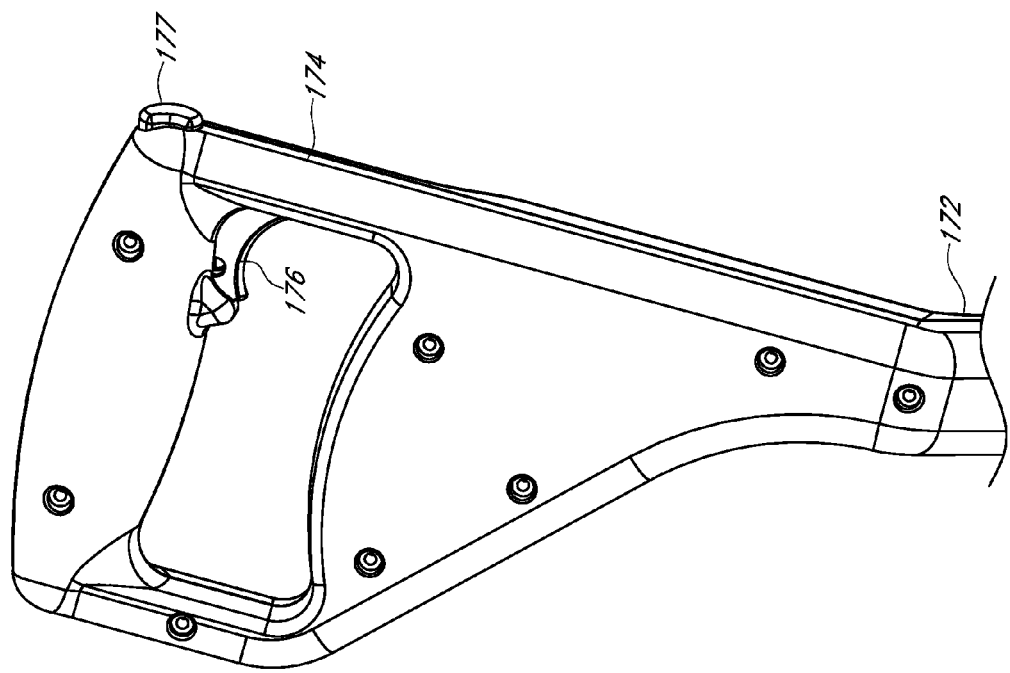
FIG. 17 is a perspective view of the grip portion and grip switch of the handle.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention (s). The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, ends, sides, etc., are referenced according to the views presented. It should be understood, however, that the terms are used only for purposes of description, and are not intended to be used as limitations. Accordingly, orientation of an object or a combination of objects may change without departing from the scope of the invention.

With reference to the figures, a pocket hole drilling machine system 10 ("machine" or "system") is presented. The pocket hole drilling machine 10 includes a cabinet 12, a top plate 14, an insert plate 16, a clamping assembly 18, an actuating assembly 20, a drilling assembly 22, a junction box assembly 24 and a fence assembly 25.

Cabinet:

Cabinet 12 is formed of any suitable size, shape and design. In one arrangement, as is shown, cabinet 12 is formed of a single piece, or said another way, cabinet 12 is formed of a monolithic or unitary design for strength, simplicity and cost savings. Cabinet 12 has a top edge 26, a bottom edge 28, a front side 30, a rear side 32 and opposing lateral sides 34 thereby forming a generally square or rectangular shape with a hollow interior cavity 36. The features of cabinet 12 generally angle slightly inwardly as they extend from the bottom edge 28 to the top edge 26 so as to allow for easy removal from a forming mold, such as a plastic injection mold, or a cast. Use of a single unitary piece molded cabinet 12 reduces the number of parts and the cost of the system 10. In addition, by having the walls of the cabinet 12 extend outward as they extend downward this increases the size of the base and therefore increases the stability of the cabinet 12.

In one arrangement, cabinet 12 is formed of a plastic material, a nylon material, a fiberglass material, a UHMW material, or any other composite and/or non-metallic material. In an alternative arrangement, cabinet 12 is formed of a metallic material, such as aluminum, steel or any alloy.

A plurality of structural features 38 are positioned in the cabinet 12. Structural features 38 are formed of any suitable size, shape and design and server to provide structural rigidity to cabinet 12. In the arrangement shown, structural features 38 are protrusions which extend outwardly a distance from the walls 30, 32, 34, 36 of cabinet 12 and angle inwardly or narrow as they extend upwardly from bottom edge 28 to top edge 26 so as to allow for easy removal from a mold or cast.

A foot 40 is positioned in each corner of cabinet 12. Feet 40 are generally round, circular or tubular in shape and have a mounting hole 42 extending through their top surface for mounting cabinet 12 to a work surface such as a work table, however any other size, shape or design is hereby contemplated for use. A compressible member 44 is positioned at the bottom side of feet 40 and serves to absorb any vibrations generated during use and also serve to eliminate the potential of damaging the work surface as well as making the system 10 more comfortable to use.

A storage compartment 46 is connected to and positioned within cabinet 12. Storage compartment 46 is formed of any suitable size, shape and design. In one arrangement, as is shown, storage compartment 46 is connected to the top edge 26 of cabinet 12 adjacent the left front corner of cabinet 12. Storage compartment 46 has a plurality of sidewalls 48 which extend downwardly and connect to a bottom surface 50 thereby defining a storage compartment area that is easily and conveniently positioned for access by a user. Storage compartment 46 is useful for storing parts, pieces, tools and the like used in association with the system 10. In one arrangement, storage compartment 46 is formed directly into cabinet 12 as a single unitary piece, which, again, eliminates additional parts or assembly. In an alternative arrangement, storage compartment 46 is formed of a separate piece that is connected to cabinet 12 by any conventional means such as bolting, screwing, gluing, welding or any other method or process.

A plurality of openings are positioned in the rear wall 32 of cabinet 12. A vacuum opening 52 provides access for a vacuum tube for dust and chip removal. A vacuum conduit 54 is connected to vacuum opening 52. Vacuum conduit 54 is a collar or tube extending inwardly into cabinet 12 and provides an access point or connection point for a conventional vacuum system. A lock opening 56 provides access for a device to lock the actuating assembly 20 and clamping assembly 18 in a closed position. A locking mechanism 58 is slidably positioned adjacent or over lock opening 56. Locking mechanism 58 has a plate portion 60 with a lever 62 extending outwardly therefrom for ease of actuation by a user. A junction box opening 64 provides access for external an external power source. A junction box 66 is connected to junction box opening 64 and is covered by junction box cover 68.

A kick stand connection member 70 is connected to cabinet 12. Kick stand connection member 70 is formed of any suitable size, shape and design. In one arrangement, kick stand connection member 70 is a pair of opposing sockets that serve to receive and connect opposing ends 72 of a U-shaped or V-shaped kick stand 74 to the system 10 and allow the kick stand 74 to be moved in and out of position. Kick stand 74 serves to prop insert plate 16 in an upward or open position. In one arrangement, kick stand 72 is a tubular or round member formed into the shape of a narrow U or V, with its ends 72 pointing away from one another and outwardly from the channel of the U or V. These ends are rotatably received within the kick stand connection member 70. Alternatively, kick stand connection member 70 is connected to top plate 14, insert plate 12 or any other portion of system 10.

Top Plate:

Top plate 14 is formed of any suitable size, shape and design. In one arrangement, as is shown, top plate 14 is formed of a single piece, or said another way, top plate 14 is formed of a monolithic or unitary design that provides strength, simplicity and cost savings. Being formed of a single piece also provides an added level of structural rigidity and robustness while reducing the number of component parts. Top plate 14 has a top surface 76 and a bottom surface 78 that extend in generally parallel spaced relation to one another and terminate at a peripheral edge that extends just past and hangs slightly over cabinet 12 when positioned on top thereof. Top plate 14 is fastened to cabinet 14 by passing conventional fasteners, such as screws or bolts either from above, through top plate 14 and into threaded holes 80 in the top edge 26 of cabinet 12, or from below, through the threaded hole 80 and into the top plate 14.

In one arrangement, top plate 14 is formed of a metallic material, such as aluminum, steel or an alloy, to provide extreme ruggedness and durability as well as a durable flat surface. In an alternative arrangement, top plate 14 is formed of a plastic material, a nylon material, a fiberglass material, a UHMW material, or any other composite and/or non-metallic material.

As is seen in the figures, top plate has a pattern of planes and grooves which provides a flat and flush planar work surface, while providing limited relief for particles, such as wood chips, to fall within the grooves so as to not interfere with the planar work surface. In one arrangement, the top plate 14 is cast out of metal, and the top surface of the planes are machined flat to take up any dimensional variance imparted through the manufacturing process. In this way, an extremely flat surface is formed.

Top plate 14 includes an insert plate opening 82. Insert plate opening 82 is positioned adjacent the forward edge of top plate 14 and provides adequate space to receive insert plate 16 therein within close tolerances.

Fence slots 84 are positioned in top plate 14 between the rearward edge of insert plate opening 82 and the rearward edge of top plate 14. Fence slots 84 are laterally elongated slots that extend in parallel spaced alignment to one another and extend in line with the length of cabinet 12. Fence slots 84 allow fence assembly 25 to slide forward and rearward so as to adjust the position of fence assembly 25. Measuring indicia 85 is positioned in or on top plate 14 adjacent fence slots 84 so as to help the user properly position and align fence assembly 25 based on workpiece thickness. Measuring indicia 85 may include ¼", ½", ¾", 1", 1&¼", 1&½", or any other measurement.

A clamp arm slot 86 is also positioned in top plate 14 between the rearward edge of insert plate opening 82 and the rearward edge of top plate 14 and allows passage of portions of clamping assembly 18 through top plate 14. Positioned adjacent the lateral sides of clamp arm slot 86, and connected to and extending outwardly from the bottom surface 78 of top plate 14 is top collar connector 88. Top collar connector 88 has a semi-circular recess therein which receives an axel shaft 90 of the actuation assembly 20 and allows it to rotate therein. A corresponding bottom collar connector 92 is connected to the top collar connector 88 by conventional fasteners 94 which serves to capture an axel shaft 90 therein and serves to allow rotation of axel shaft 90 therein between the top collar connector 88 and a bottom collar connector 92. When connected together, a circular opening, when viewed from the side, exists between top collar connector 88 and bottom collar connector 92.

A handle slot 96 is also positioned in top plate 14 between the rearward edge of insert plate opening 82 and the rearward edge of top plate 14 and allows passage of portions of actuating assembly 20 through top plate 14. Handle slot 96 is positioned adjacent to and to the right of clamp arm slot 86 when viewing the machine 10 from the front side.

Hinges 98 are connected to the rearward edge of insert plate opening 82 and extend partially into, insert plate opening 82. Hinges 98 have a socket 100 positioned a distance below the top surface 76 and bottom surface 78 of top plate 14. Socket 100 extends inward from the rearward edge of insert plate opening 82. A cradle 102 sits within an interior opening in the socket 100 and is moveable up and down within socket 100 by an adjustment member 104, which in this arrangement is a threaded shaft such as a screw. As the adjustment member 104 is threaded in and out of socket 100, cradle 102 is raised and lowered thereby leveling the insert plate 16 when connected thereto. Cradle 102 has a sloped or semicircular cutout in its upper surface, similar to what is known as a Woodruff Key, which serves to both hold the insert plate 16 therein while also allowing rotation of insert plate 16 thereon.

Insert Plate:

Insert plate 16 is formed of any suitable size, shape and design. In one arrangement, as is shown, insert plate 16 is formed of a single piece, or said another way, insert plate 16 is formed of a monolithic or unitary design for strength, simplicity and cost savings. Being formed of a single piece also provides an added level of structural rigidity and robustness while reducing the number of component parts. Like top plate 14, insert plate 16 has a top surface 76 and a bottom surface 78 that extend in generally parallel spaced relation to one another and terminate at a peripheral edge. Insert plate 16 fits within the insert plate opening 82 of top plate 14 within close tolerances.

Like top plate 14, insert plate 16 is formed of a metallic material, such as aluminum, steel or an alloy, to provide extreme ruggedness and durability as well as a durable flat surface. Alternatively, insert plate 16 is formed of a plastic material, a nylon material, a fiberglass material, a UHMW material, or any other composite and/or non-metallic material.

Like top plate 14, insert plate has a pattern of planes and grooves which provides a flat and flush planar work surface, while providing limited relief for particles, such as wood chips, to fall within the grooves so as to not interfere with the planar work surface. In one arrangement, the insert plate 16 is cast out of metal, and the top surface of the planes is machined flat to take up any dimensional variance imparted through the manufacturing process. In this way, an extremely flat surface is formed.

Connecting keys 106 are positioned adjacent the rearward corners of insert plate 16 and extend outwardly therefrom. Connecting keys 106, when viewed from the side, have a semi-circular bottom surface 108 which is sized and shaped to be received by and rotate within the semi-circular cutout in the upper surface of cradle 102. A step 110 is positioned in the flat upper surface of connecting key 106 and serves to provide a recess therein for receiving the edge of top plate 14. When insert plate 16 is inserted within the insert plate opening 82 of top plate 14 and is fully closed, step 110 receives or is in engagement with the bottom surface 78 of top plate 14.

A drill bit opening 112 is positioned in the insert plate 16. Drill bit opening is approximately in the shape of an ellipse and is disposed to receive a drill bit guide 114 that guides the shank of a drill bit or stepped drill bit 116 at an angle to form pocket holes. The drill bit guide 114 is angularly disposed with respect to the front planar surface of insert plate 16 and top plate 14. The drill bit guide 114 has one or a plurality of chip openings 118 therein to allow passage of dust and particles during the drilling operation. Although the precise angle can vary, an angle of about 15 degrees is commonly used to form pocket joints in wooden or composite (i.e., material dense fiberboard (MDF), particle board, etc.) workpieces, although the invention is not so limited. The angle can also be greater or less than 15 degrees. In a particular embodiment the angle is about 14 degrees.

To facilitate this arrangement, a guide block 120 is connected to the bottom surface of insert plate 16. Guide block 120 has three bores 122 positioned therein. The exterior bores 122 receive guide rods 124 whereas the centrally positioned bore 122 receives the drill bit guide 114. The guide rods 124 and drill bit guide 114 are held in place by at least one locking fasteners inserted into threaded openings 126 accessible from the bottom side of guide block 120. When in position in guide block 120, drill bit guide 114, drill bit 116 and guide rods 124 are positioned in approximate parallel spaced alignment to one another and at approximate identical alignment to the plane of insert plate 16. The guide rods 124 and drill bit guide 114 define a drilling direction, that is the drilling assembly 22 moves between a retracted position, on non-drilling position, and an extended position, or a drilling position, in the plane defined by the length or bore of the guide rods 124 and drill bit guide 114. Guide block 120 has chip openings 128 that correspond with the chip openings 118 in the drill bit guide 114 so as to allow dust and particles to exit guide block 120.

A dust collection assembly 130 is connected to the bottom surface of guide block 120. Dust collection assembly 130 is formed of any suitable size and shape and covers the bottom area of guide block 120 adjacent the chip openings 128, 118 and serves to remove them from the interior cavity 36 of cabinet 12. In one arrangement, dust collection assembly 130 has a frame 132 which is fastened to the bottom of guide block 120 or insert plate 16 by conventional fasteners 134. A conduit 136 extends out of the bottom of frame 132 and serves as a connection point for a vacuum hose that extends between conduit 136 and vacuum conduit 54 which is connected to the vacuum opening 52 on the rear side of cabinet 12.

Insert plate 16 also includes a locking mechanism 136. Locking mechanism 136 is any form of a mechanism which serves to keep insert plate 16 in a closed position on and in the insert plate opening 82 of top plate 14. In one arrangement, as is shown, locking mechanism 136 is centrally positioned adjacent the forward edge of insert plate and extends outwardly from the bottom surface of insert plate 16 and includes a rotatable lever which, when in a closed position, rotates around and engages the bottom surface of top plate 14, thereby holding the insert plate 16 in a closed position. In an alternative arrangement, it is also hereby contemplated that locking mechanism 136 includes a spring loaded latching mechanism, such as is common arrangement, in conventional residential doors, that deflects when forced closed thereby holding the two components 14, 16 together. In this arrangement, the two components are separated by a user pressing on or withdrawing the spring loaded latching mechanism, which removes it from engagement with the top plate 14 thereby allowing the insert plate to be opened. Any other form of a locking mechanism 136 is hereby contemplated.

Drilling Assembly:

Drilling assembly 22 is formed of any suitable size, shape and design. In one arrangement, as is shown, drilling assembly includes an electrically powered drill motor 138, however a pneumatic, hydraulic or any other form of a drill motor is hereby contemplated for use. A collar 140 is connected to the front end of drill motor 138 and includes a pair of alignment guides 142 which are sized and shaped to receive and allow guide rods 124 to pass there through with close sliding alignment. In this way, the front to back actuation of drill motor 138 is aligned with the axis of bores 122 in guide block 120. A connecting rod tab 144 is centrally positioned with respect to the alignment guides 142 which are positioned on opposite sides of drill motor 138, and directly below the chuck 146 of drill motor 138. Connecting tab 144 extends below chuck 146 and connects at a joint or pivot point to a connecting rod 148 which serves to move drill motor 138 forward and back while also allowing the insert plate 16 to be tilted open. In the arrangement shown, connecting rod 148 is arcuate in shape and curves in an upward facing arc. This curvature provides connecting rod 148 adequate alignment and clearance around the other components of the system 10 throughout the drilling procedure.

In one arrangement, chuck 146 is a heavy duty square or hex-drive quick release drill chuck with a spring loaded locking sleeve 150 positioned over a square or hexagonal bore which quickly and easily receives and locks drill bits 116 therein. Quick release chucks of this and other various designs are well known in the industry and are made by various manufacturers.

A stretchable electric cord 152 connects drill motor 138 to junction box assembly 24. Such cords 152 are commonly known as pig-tail cords, however any other form of a cord is hereby contemplated for use.

Actuating Assembly:

Actuating assembly 20 is formed of any suitable size, shape and design. Actuating assembly 20 serves to actuate or turn on and move the other components of the system 10. In one arrangement, as is shown, actuating assembly 20 is formed of a plurality of components that operate and/or move in unison with one another. While the forward end of connecting rod 148 connects to the connecting rod tab 144 of drilling assembly 22, the rearward end of connecting rod 148 connects to actuating assembly 20. More specifically, the rearward end of connecting rod 148 connects to the forward side of actuating bracket 154.

Actuating bracket 154 is formed of any suitable size, shape and design. In one arrangement, as is shown, actuating bracket 154 has a generally L-shaped design when viewed from the side. The bottom end of actuating bracket 154 has a lock notch 156 therein. When in a fully engaged position, or a fully closed position, the bottom end of actuating bracket 154 extends through lock opening 56. In this position, locking mechanism 58 is engaged within lock notch 156, thereby locking the system 10 in a fully engaged, or fully closed position.

The top end of actuating bracket 154 is connected to axel shaft 90. In one arrangement, actuating bracket 154 is permanently welded or formed thereto. Axel shaft 90 extends laterally outwardly from either generally flat side of actuating bracket 154. In one arrangement, axel shaft 90 and is perpendicularly aligned to actuating bracket 154.

Actuating bracket 154 is generally centrally aligned with the system 10, as is drill motor 138, drill bit opening, and connecting rod 148. Extending from the top rear side of actuating bracket 154 is a stop arm 158. Stop arm 158 extends rearward and at a slight downward angle the top end of actuating bracket 154. Stop arm 158 serves to set the depth of the drill bit 116 for various applications and various workpiece thicknesses. As the drill bit 116 is engaged, the actuating bracket 154 rotates rearward on an axis 160 which extends through the center of axel shaft 90 which causes the bottom end of actuating bracket 154 to move rearward, and simultaneously causes the stop arm 158 to rotate towards the bottom surface of top plate 14. A depth stop assembly 162 extends through the top plate 14 and adjustably engages the top surface of the stop arm 158. Depth stop assembly 162 includes a threaded shaft 164 having an actuating knob 166 and a locking nut 168 thereon. The threaded shaft 164 threadably extends through the top plate 14. The depth at which the threaded shaft 164 extends into the cavity 36 of cabinet 12 is threadably adjustable by rotating knob 166. Once the desired depth is achieved, locking nut 168 is tightened thereby locking depth stop assembly 162 in place. The deeper the threaded shaft 164 extends into cavity 36, the shallower the resulting pocket hole.

A handle support 170 is connected to axel shaft 90 and extends upwardly therefrom. Handle support 170 is formed of any suitable size, shape and design. In one arrangement, handle support 170, like actuating bracket 154 is a generally flat and planar bracket. In the arrangement shown, handle support 170 extends upwardly with a single bend or curve therein to provide improved ergonomics and comfort of use. In one arrangement, like axel shaft 90 and actuating bracket 154, handle support 170 is formed of a metallic bacterial such as aluminum, steel, alloy or the like, so as to provide superior strength and rigidity and wear resistance.

Handle body 172 connects to and is positioned around handle support 170. Handle body 172 is formed of any suitable size, shape and design. In the arrangement shown, handle body 172 is formed of a pair of halves that connect together at a seam line therebetween. In one arrangement, these halves are injection molded or formed in any other manner using a plastic material, a nylon material, a fiberglass material, a UHMW material, or any other composite and/or non-metallic material for strength, cost savings and ergonomic and aesthetic purposes. The halves of handle body 172 are connected to one another in any conventional manner such as using conventional fasteners such as screws or bolts which extend from the bottom half to the top half as is shown. Alternatively snap-fit features are user to connect the two halves, alternatively the two halves are adhered or welded together, or alternatively any other method or process is used.

Handle body 172 terminates at a grip portion 174 and having an opening therein which is large enough to receive a user's entire hand. Positioned within this opening is a grip switch 176 which is depressible by any portion of the user's hand. This full hand grip portion 174 and grip switch 176 provides the user with substantial control over the device and improves the safety of using the device. To further improve safety, a thumb button 177 is also presented in grip portion 174. A cord, not shown, connects to the grip switch 176, extends through the handle body 172 and connects to electrical connector at the base of the handle body 172. This cord, extends from electrical connector and into junction box assembly 24. Grip switch 176 and thumb button 177 prevents power from being sent to drill motor 138 before grip switch 176 and thumb button 177 are simultaneously depressed, which is an added safety feature. In addition, in some arrangements, handle body 172 is prevented from rotating before grip switch 176 and/or thumb button 177 are depressed.

Because actuating bracket 154 is centrally positioned in cabinet 12, handle support 170 is off center to actuating bracket 154. That is, as is shown, handle support 170 and actuating bracket 154 are connected to one another by axel shaft 90, with the handle support 170 being laterally positioned to one side of actuating bracket a distance. This lateral off-set allows handle bracket 170 and handle body 172 to be moved almost to the top surface of top plate 14 without interfering with the other components of the system which extend above the top plate 14, such as clamping assembly 18.

A torsion spring 178 is connected at one end to one end of the axel shaft 90 of the actuating assembly 20 and at the other end to cabinet 12, or top plate 14, or any other stationary portion of system 10. In this arrangement shown, torsion spring 178 is connected to a keeper 179 on the end opposite axel shaft 90. Keeper 179 extends within a portion of torsions spring 178, as does a portion of axel shaft 90, thereby keeping the alignment of torsion spring 178 firing the drilling operation. During the drilling operation, the end of torsion spring 178 connected to axel shaft 90 rotates with axel shaft 90 as the handle body 172 is pulled downward (known as the rotating perch); whereas the opposite end of torsion spring 178 connected to keeper 179, which is connected to a stationary portion of system 10 remains stationary as the handle body 172 is pulled downward (known as the stationary perch). In this manner, torque or a rotational force is created by the torsion spring 178 which keeps handle body 172 in the upright position in a static position. A user must overcome this torsional force or torque in order to perform a drilling operation. In one arrangement, keeper 179 is held within a top collar connector 88 and bottom collar connector 92 by fasteners 94 in the similar way that axel shaft 90 is held to the bottom surface of top plate 14.

Clamping Assembly:

Clamping assembly 18 is formed of any suitable size, shape and design and serves to hold a workpiece flush against the top plate 14 and insert plate 16 while drilling a pocket hole. In one arrangement, clamping assembly 18 is formed of at least one, and as is shown a pair of clamping springs 180 connected to a clamping arm 182. When viewed from the side, clamping arm 182 is arcuately shaped in a C or J shape. Spring arms 184 extend outwardly from the sides of clamping arm 182 and are positioned at or near the bottom end of clamping arm 182. The forward end of clamping springs 180 connect to the spring arms 184 of clamping arm 182, and the rearward end of clamping springs 180 connect to a stationary portion of system 10, such as the underside of top plate 14. Clamping springs 180 are extension springs in tension, meaning they are at least partially stretched and therefore have an inward force. This force tends to pull clamping arm 182 towards top plate 14.

To keep proper spacing between the clamp arm 182 and the actuating bracket 154, a bearing tab 186 extends outwardly from the rearward side of clamping arm 182 at or near it bottom end. A rotatable bearing 188 is connected to the bearing tab 186. This rotatable bearing 188 engages the forward or front surface of actuating bracket 154. In this way, this physical engagement establishes the minimum distance between these portions of the clamping arm 182 and the actuating bracket 154 which allows a pre-load to be put on the clamping springs 180 when they are stretched between spring arms 184 and their rearward stationary connection to system 10. In this arrangement, as the handle 172 is pulled toward the top plate 14, the actuating bracket 154 rotates rearward on axis 160 of axel shaft 90. Due to the pull of clamping springs 180, this pulls the bottom end of clamping arm 182 rearward, causing rotatable bearing 188 to roll upward on the forward edge of actuating bracket 154. In this way, proper spacing is kept between the two components. To ensure proper rotation of clamping arm 182 upon actuating bracket 154 a cam surface 189 is placed in the forward edge of actuating bracket 154. In the arrangement shown, cam surface 189 is an arcuate recess that is sized and shaped to fully receive rotatable bearing 188 therein when handle body 172 is in a full upright position. As the handle body 172 is pulled downward, the rotatable bearing 188 climbs up out of this arcuate recess of cam surface 189 into a straight or vertical surface. At some point in the drilling operation, as the handle body 172 is pulled downward, the rotatable bearing 188 separates from contact with actuating bracket 154. This usually occurs about the time the clamping arm 182 engages a workpiece. At this point, the downward force of the clamping arm 182 is generated from the compression force stored within the clamping springs 180. The cam surface 189 allows for a smooth transition between engagement of the rotatable bearing 188 with the actuating bracket 154 and disassociation with actuating bracket 154. The opposite process occurs when the handle body 172 is again raised after a drilling operation and the rotatable bearing 188 again engages the actuating bracket 154. This engagement causes the rotatable bearing 188 to roll down the front surface of actuating bracket 154 until the rotatable bearing 188 is fully received within the cam surface 189 of actuating bracket 154 in a full upright position of handle body 172. In this full upright position, the torque generated by torsion spring 178 overcomes the pull of the clamping springs 180.

The upper end of clamping arm 182 is connected to and rotates upon a clamping axel 190 which extends through a pivot opening 192 in the upper end of clamping arm 182. Clamping axel 190 is connected to and supported by tower 194. Tower 194, when viewed from the side, has a similar C or J shape as does clamping arm 182. Tower 194 includes opposing sidewalls 196 which are positioned in generally parallel spaced relation to one another. The upper and/or rearward edge of sidewalls 196 are connected by connecting wall 198. In this way, sidewalls 196 and rear wall 198 form a channel therebetween in which clamping arm 182 is positioned. This channel is sized and shaped to allow free motion of clamping arm 182 between a fully disengaged position and a fully engaged or clamping position. The bottom edge of the sidewalls 196 and connecting wall terminate in a mounting plate 200 which has openings in each of the mounting plate's four corners which receive conventional fasteners 202 which serve to mount tower 194 to top plate 14. In the arrangement shown, mounting plate 200 also includes a threaded collar 204 which threadably receives the threaded shaft 164 of depth stop assembly 162. Tower 194 is mounted over clamp arm slot 86.

Clamping pad assembly 206 is connected to the upper end of clamping arm 182 and serves to clamp a workpiece against the top plate 14 when drilling a pocket hole. Clamping pad assembly 206 is formed of any suitable size, shape and design. In one arrangement, as is shown, clamping pad assembly includes a threaded shaft 208 having an actuating knob 210 and a locking nut 212 thereon. The threaded shaft 208 extends through a vertical threaded bore 214 adjacent the upper end of clamping arm 182 and terminated in a clamping pad 216 which is angularly adjustable on a ball joint, or any other joint, so as to adjust to various angles produced by various work piece thicknesses. To adjust for work piece thickness, the actuating knob 210 is rotated, and the locking nut 212 is locked in place once properly adjusted.

In one arrangement additional return spring 218 (not shown) can be connected on one end to the lower end of clamping arm 182 and extends forward to connect on the opposite end to guide block 120, the bottom surface of top plate 14, or any other component of the system 10. Return spring 218 adds additional return force to clamping arm 182. However, in some arrangements, when clamping springs 180 are aligned at the proper angle and have a sufficient amount of force clamping springs 180 provide a sufficient amount of return force rendering return spring 218 unnecessary.

Clamping springs 180 pull the clamping pad 216 in a clamping direction, wherein the clamping pad 216 engages and presses down on a workpiece and forces the workpiece into engagement with the top surface of top plate 14 and insert plate 16. A non-clamping position occurs when the force of the torsion spring 178 overcomes the clamping springs 180 and the clamping pad 116 is disengaged with the workpiece.

Fence Assembly:

Fence assembly 25 is formed of any suitable size, shape and design and serves to provide an adjustable fence and adjustable stop for a workpiece when drilling pocket holes using the system 10. In one arrangement, as is shown, fence assembly 25 includes a rail 220 which is generally formed out of a piece of extruded or machined metal, such as aluminum or alloy, however any other form of metal is hereby contemplated for use due to its strength and rigidity and resistance to bending or deflection. In an alternative arrangement, rail 220 is formed of a plastic material, a nylon material, a fiberglass material, a UHMW material, or any other composite and/or non-metallic material. Rail 220 extends a length between opposing ends 222 and is a generally consistently shaped piece from end 222 to end 222.

When viewed from the side, rail 220 has a generally flat bottom surface 224 which rides upon the top surface of top plate 14 and/or insert plate 16. The top surface 226 of rail 220 includes an arcuate recess 227 which may serve as an alignment feature or cam feature as is further described herein. A T-slot 228 is positioned on the forward edge of rail 220 between the bottom surface 224 and the top surface 226. A tab 230 extends forward from the top edge of T-slot 228 a distance and connects to a flange 232. Tab 230 extends generally in parallel spaced relation to the top surface of top plate 14 and insert plate 16, whereas flange 232 extends in generally perpendicular alignment to the plane of top plate 14 and insert plate 16. In this arrangement, the forward face of flange 232 provides a flat and flush surface for aligning an edge of a workpiece thereon.

As is seen in the figures, the surfaces, other than the arcuate recess 227, may include small reliefs, recesses, flanges, rails, protrusions or tabs. These features help to provide additional structural rigidity, and at least in the case of the bottom surface 224, allow for particles to fall into the recesses and not interfere with the flush engagement of the bottom surface 224 with the top surface of top plate 14 and/or insert plate 16.

Figure 18:
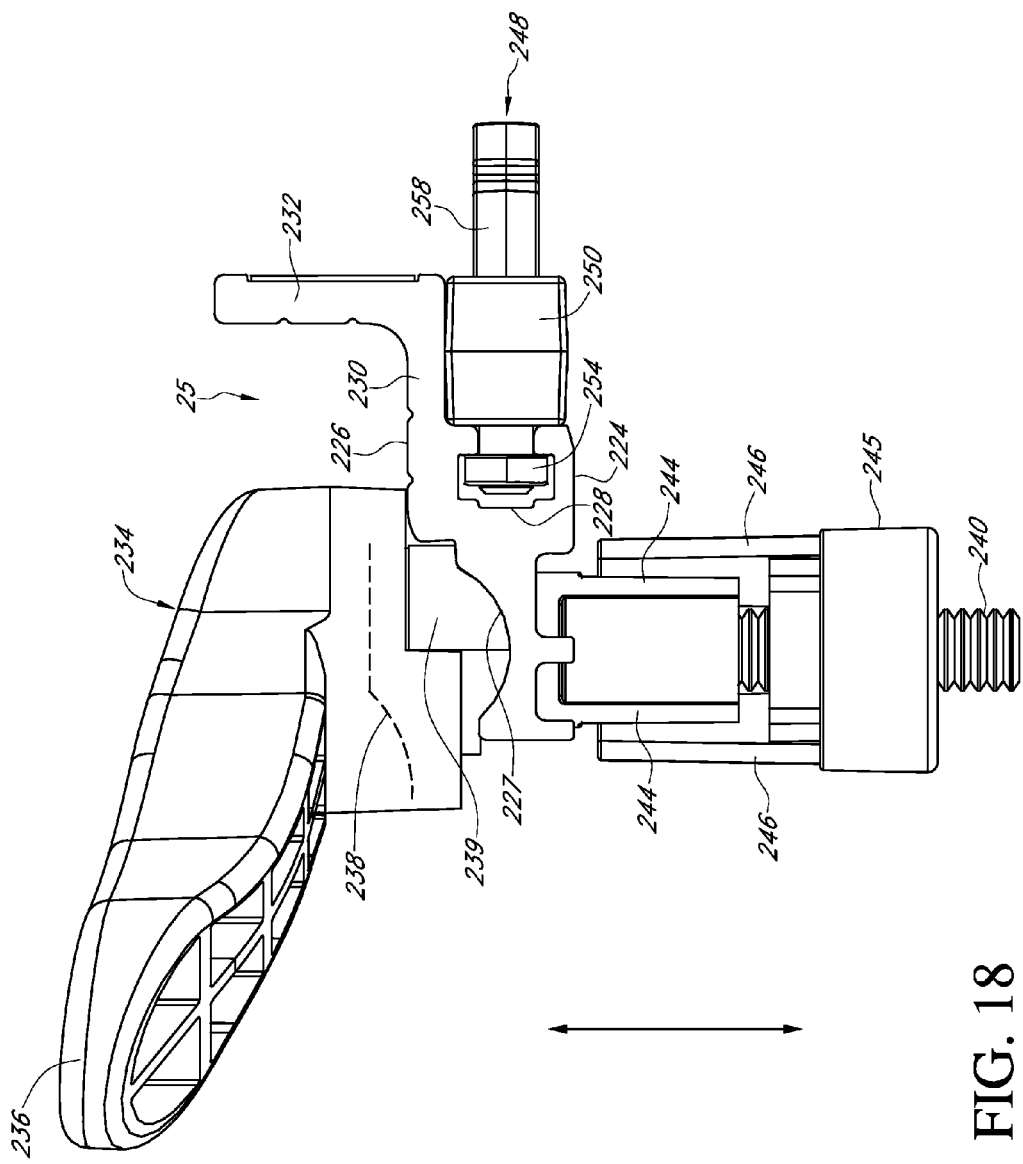
FIG. 18 is a side elevation view of the fence assembly with an adjustable stop positioned therein, the view showing the spring loaded stop arm in an extended position, the view also showing the cam locks of the fence assembly.
Figure 19:
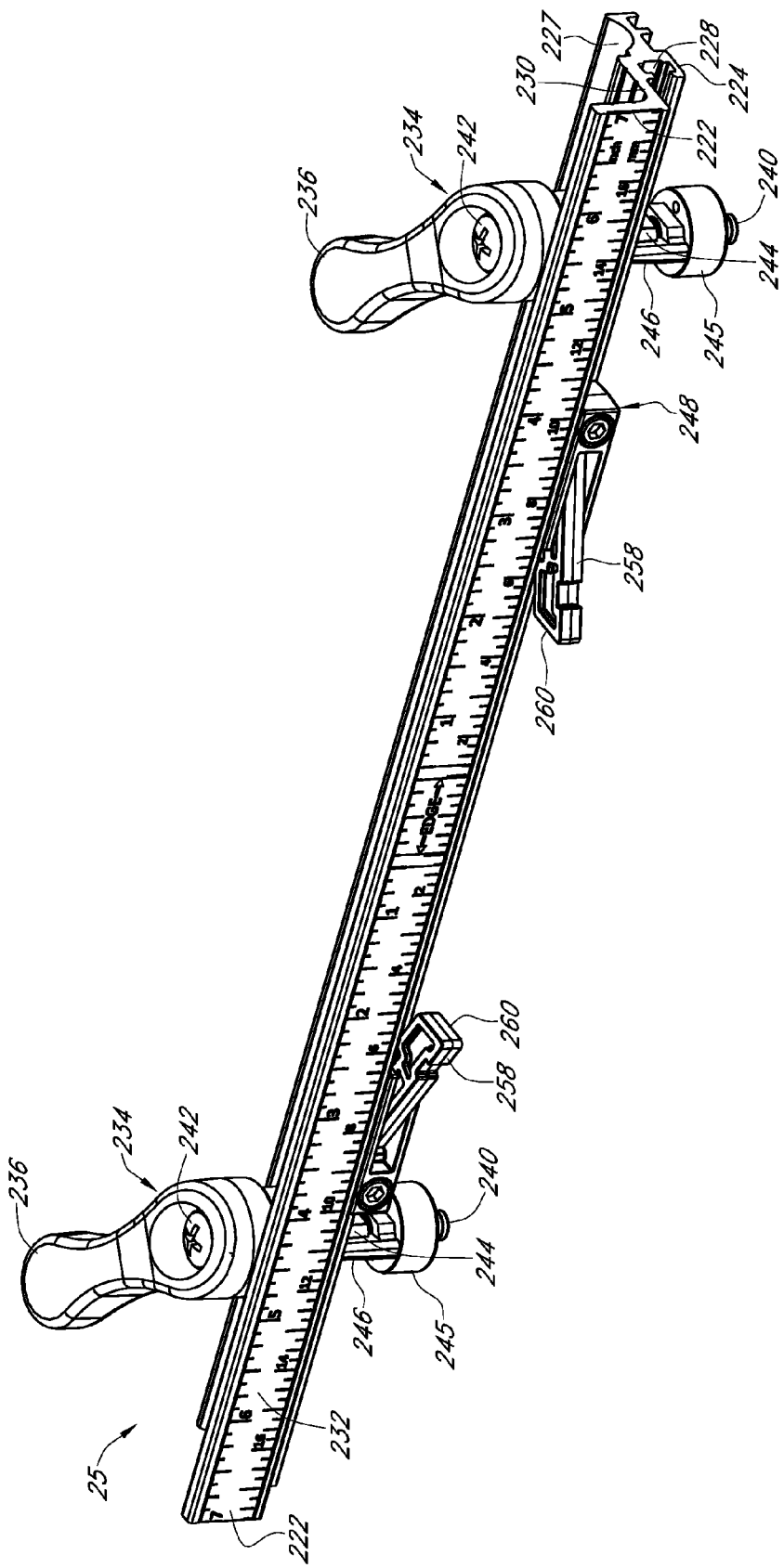
FIG. 19 is a front perspective view of the fence assembly with adjustable stops positioned therein, the view showing the spring loaded stop arms in an extended position and the cam locks in a locked position.
Figure 21:
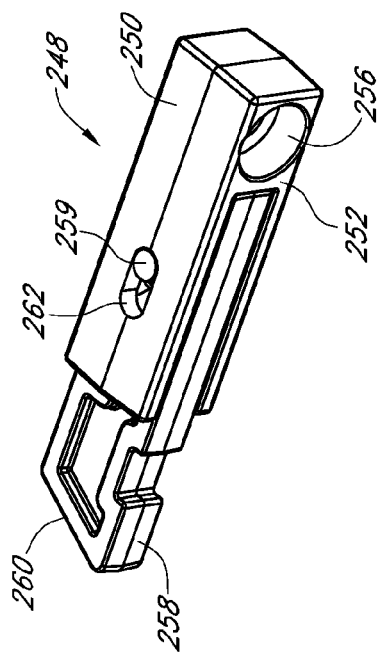
FIG. 21 is a front perspective view of the spring loaded stop arms in a retracted position.
Figure 20:
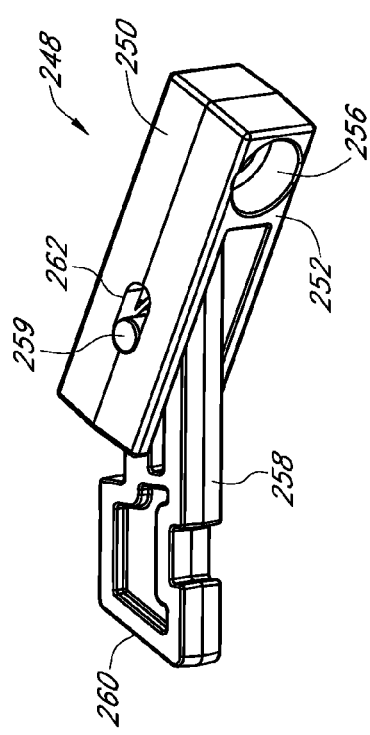
FIG. 20 is a front perspective view of the spring loaded stop arms in an extended position.
Figure 22:
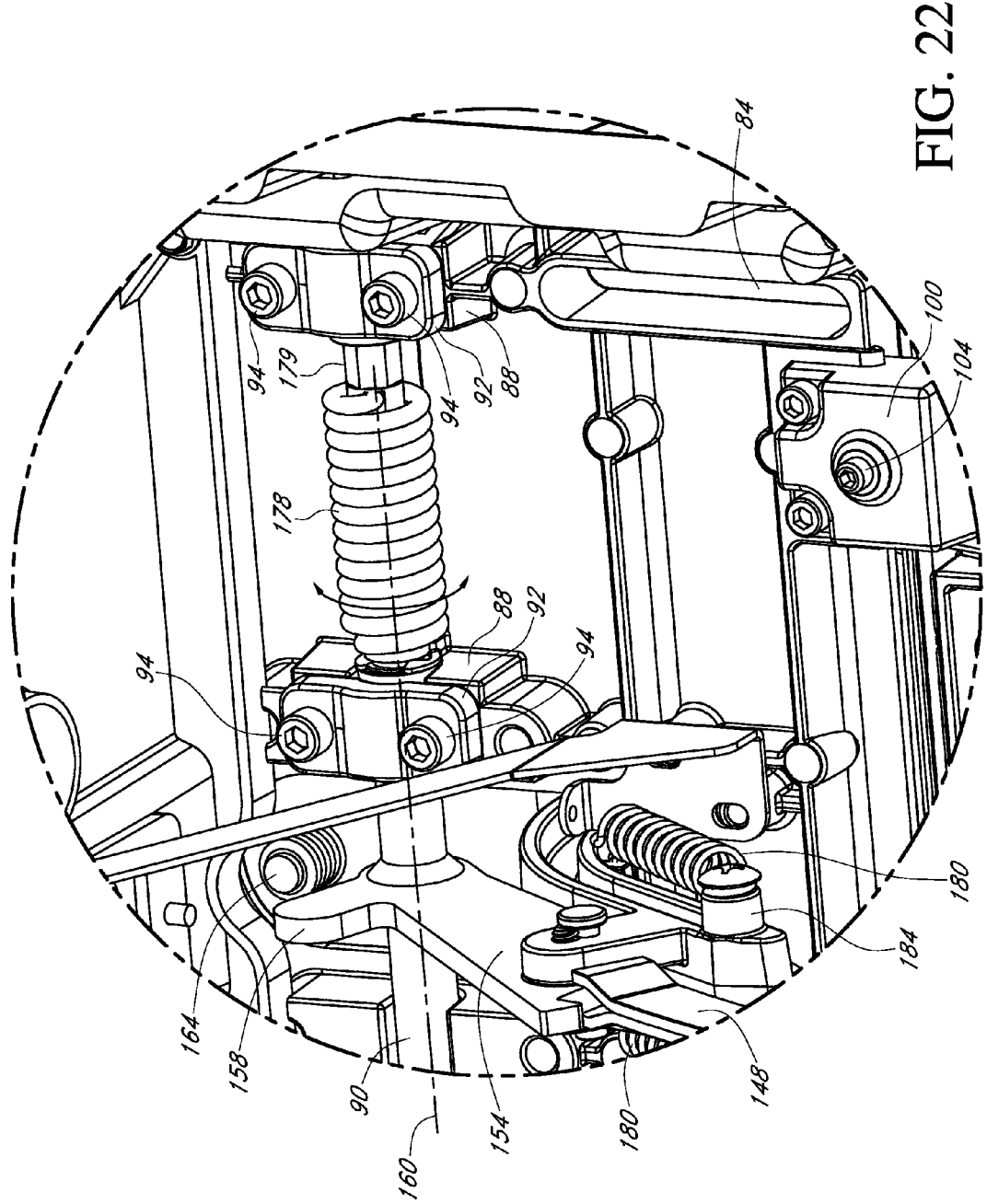
FIG. 22 is a bottom perspective view of the torsion spring connected to the actuating assembly of the handle support, the view also showing the extension springs of the clamping arm, and the view also showing the threaded shaft of depth stop assembly disengaged with the stop arm.
Figure 23:
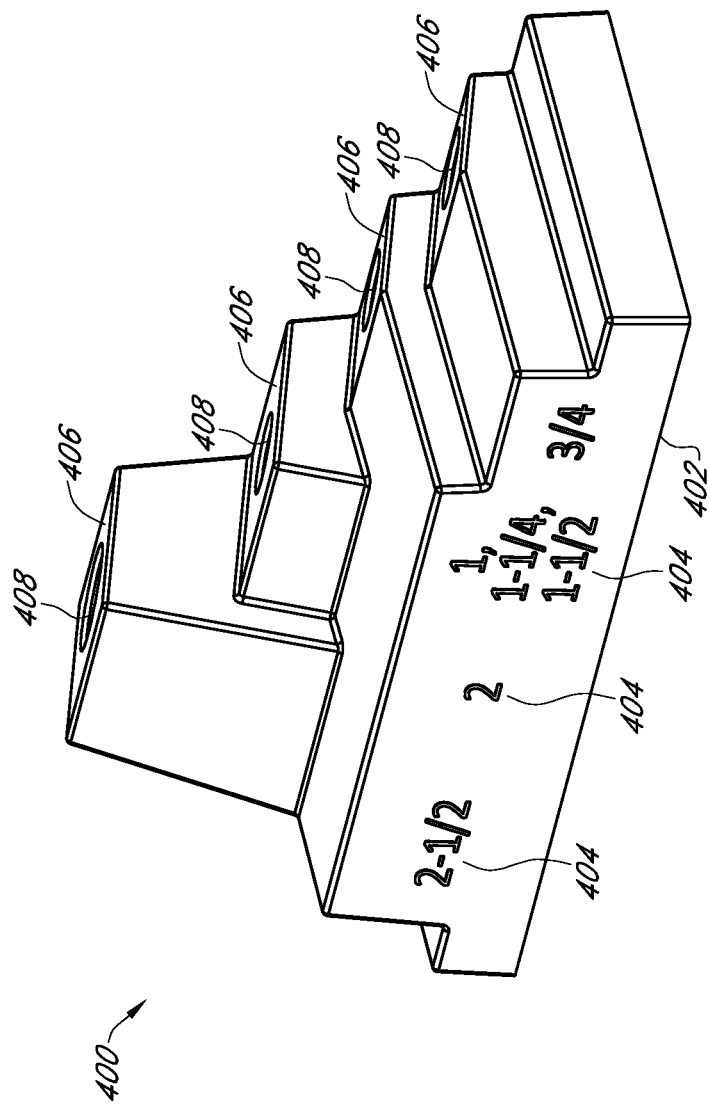
FIG. 23 is a perspective view of a drill setting gauge for use with the pocket hole drilling machine.
Figure 24:
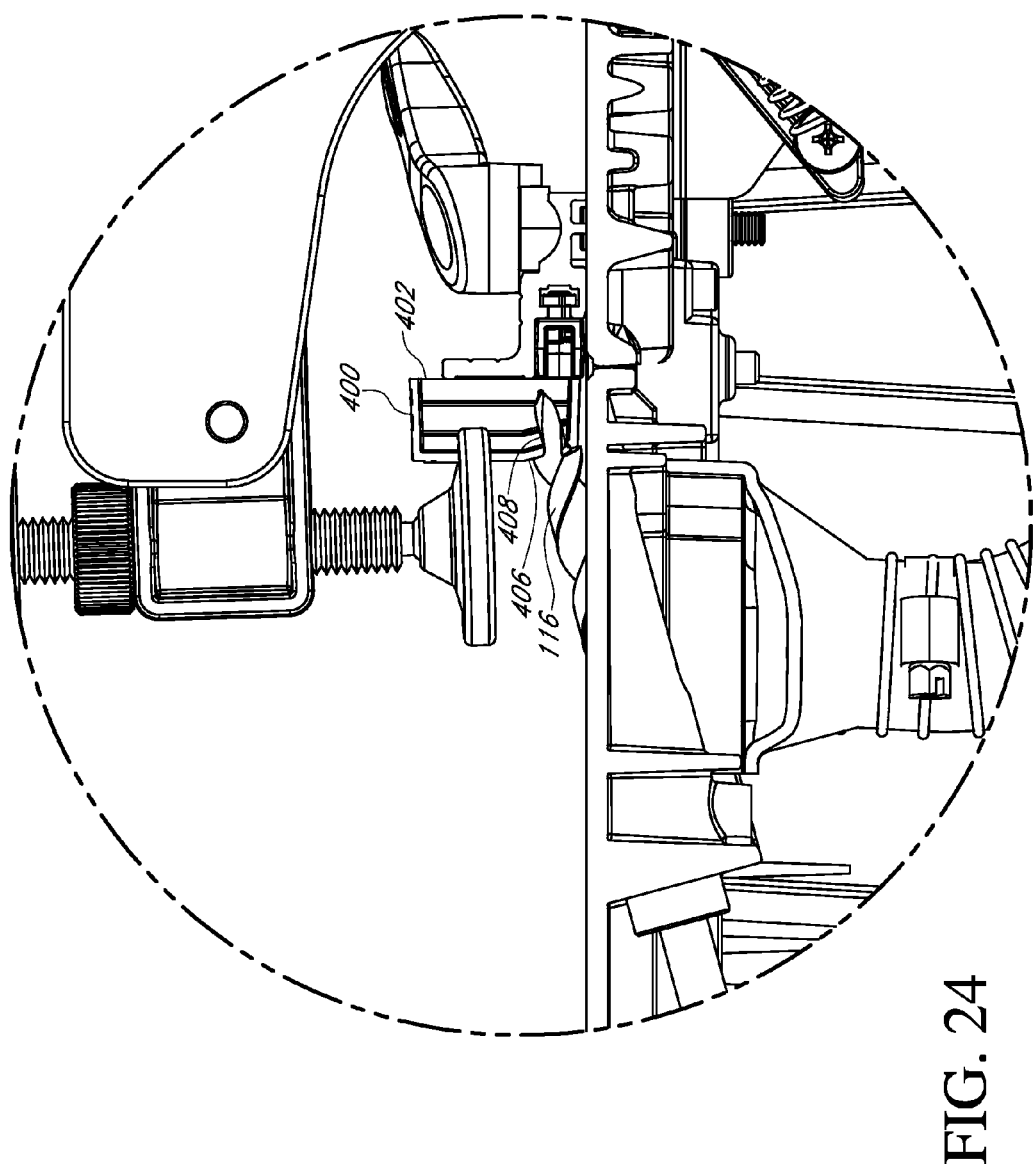
FIG. 24 is an elevation cut away view of the pocket hole drilling machine, showing the cabinet, the top plate, the insert plate, the clamping assembly, the fence assembly, with the drill bit engaged with the drill setting gauge of FIG. 23 to set the depth of the drill bit using the depth stop assembly.
Figure 25:
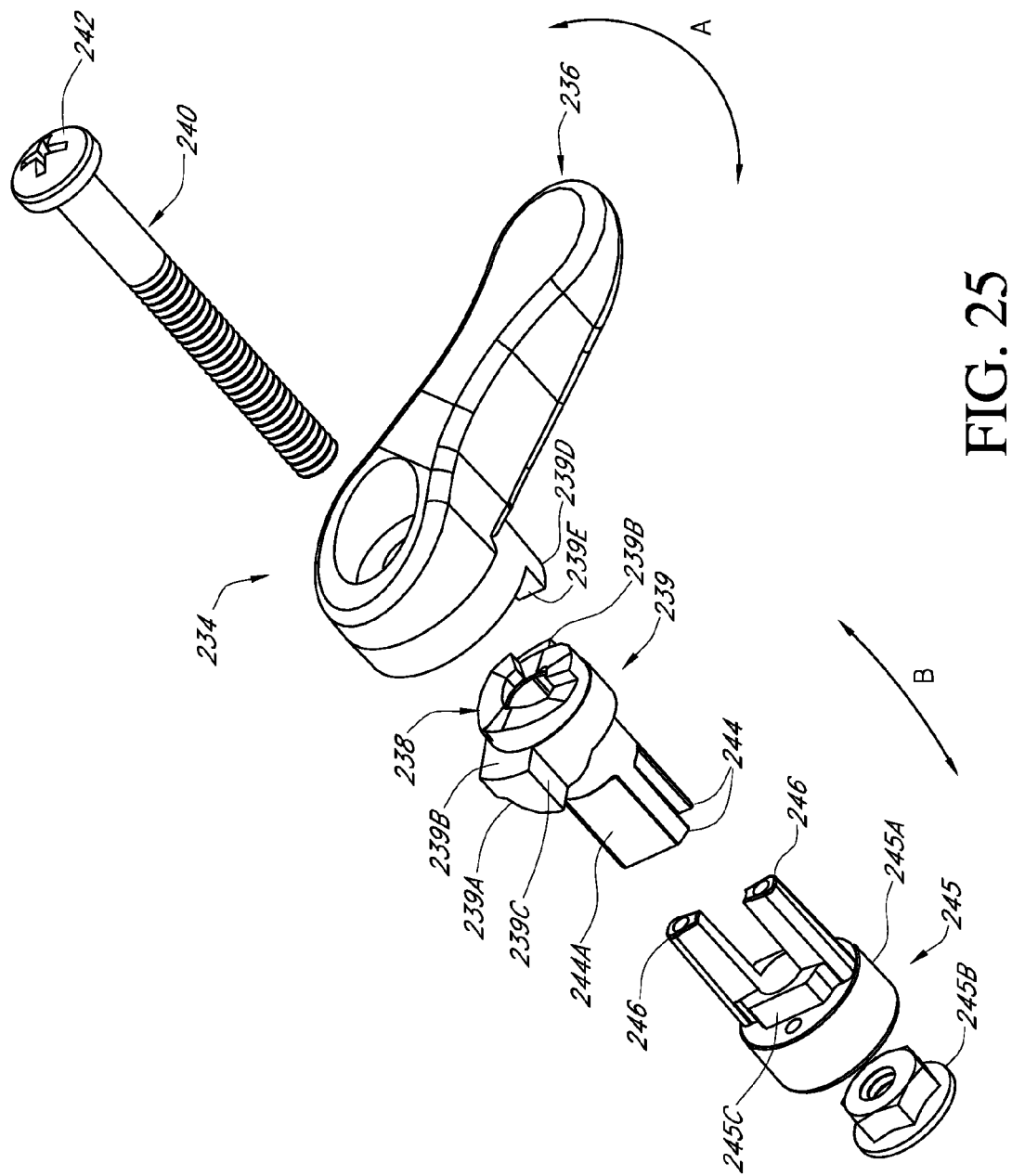
FIG. 25 is a perspective exploded view of the cam lock of the fence assembly shown in FIGS. 18 and 19, the view showing the cam surfaces in the top carrier and the arrangement of the alignment arms of the top carrier with the alignment arms of the bottom carrier.
Figure 26:
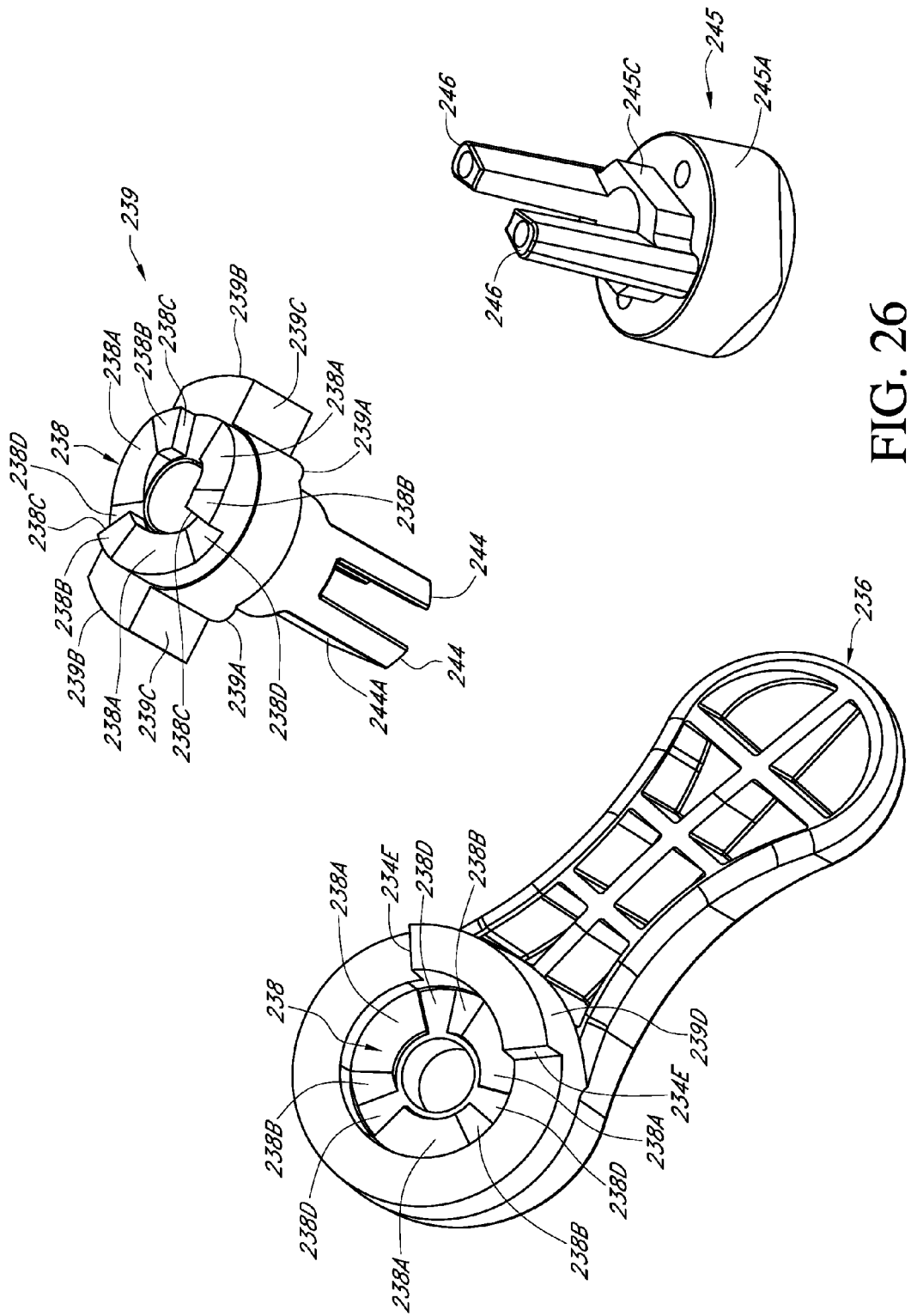
FIG. 26 is another perspective exploded view of the cam lock of the fence assembly shown in FIGS. 18, 19 and 25 the view showing the cam surfaces in the top carrier and the handle portion.
Figure 27:
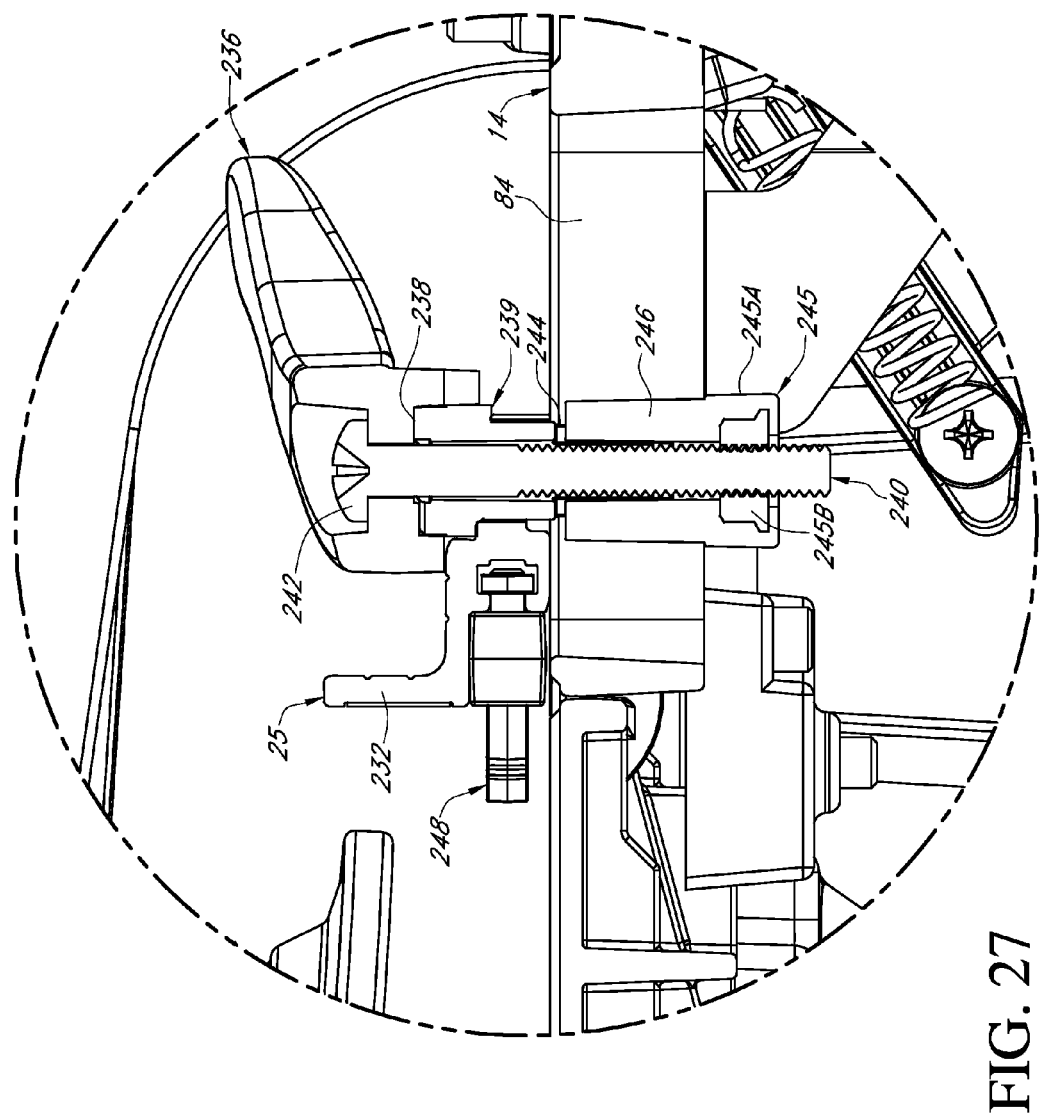
FIG. 27 is a cut-away elevation view of the fence assembly attached to the top plate with the cam lock in a locked position, the view showing the handle portion and top carrier positioned above the top plate and the bottom carrier positioned below the top plate.

A pair of cam locks 234 are connected to rail 220, one positioned adjacent to or inward from each end 222. Cam locks 234 include a handle portion 236 which is formed of any suitable size, shape or design. Handle portion 236 includes a cam surface 238 (shown in hidden lines in FIG. 18) on its lower end which is sized and shaped to engage and be received by a top carrier 239.

The upper surface of top carrier 239 has a similar, yet opposite cam surface 238 as that positioned in the bottom surface of handle portion 236. The lower surface of top carrier 239 has a curved surface 239A that mirrors arcuate recess 227 in the top surface of rail 220, such that this curved surface sits within and is held within arcuate recess 227 in flush mating engagement. Top carrier 239 also includes a pair of opposing arms 239B that extend outwardly and in opposite directions to one another, the bottom surface of these arms 239B includes curved surface 239A, whereas the top surface of arms 239B is generally flat. Arms 239B extend outwardly in the length or direction of the arcuate recess 227 of rail 220 and in this way, the combination of the side-to-side length of arms 239B and the curved surface 239A in the bottom of arms 239B provides for alignment of top carrier 239 in rail 220. In the arrangement shown, arms 239B only occupy half the forward to back width of top carrier 239, and arms 239B are positioned on one side, either the forward or rearward side, of top carrier 239. Because arms 239B only occupy one half the width of the top carrier 239, arms 239B form a stop surface 239C at the edge where arms 239B terminate. The plane of stop surface 239C is aligned with or extends outwardly at about the middle of the top carrier 239.

In one arrangement, as is shown, the cam surface 238 in top carrier 239 includes three angled surfaces 238A that are formed in both handle portion 236 and top carrier 239, however any other number of angled surfaces 238A are hereby contemplated for use such as one, two, four, five or more. Angled surfaces 238A ramp or angle upward/downward, in either straight or curved fashion, and connect to a top landing area 238B adjacent their top end before terminating in a ledge or step 238C. Ledge or step 238C extends downward from the upper most edge of one angled surface 238A to the lower most edge of the adjacent angled surface 238A. That is, ledge or step 238C extends vertically or parallel to the length or height of cam lock 234. Adjacent the bottom of each ledge or step 238C is a bottom landing area 238D that is similar if not identical in size and/or shape to the top landing area 238B, positioned at the top of the angled surfaces 238A. In this way, step 238C connects the top landing area 238B of one cam surface 238 to the adjacent bottom landing area 238D of the adjacent cam surface 238.

The cam surfaces 238 positioned in the handle portion 236 are similar or identical to or mirror images of the cam surfaces 238 positioned in the top carrier 239. In this way, the cam surfaces 238 positioned in the handle portion 236 nest in the cam surfaces 238 in the top carrier 239 in a lowered position; whereas the cam surfaces 238 in the handle portion 236 oppose the cam surfaces 238 in the top carrier 239 in a raised position. To maintain alignment of handle portion 236 on top carrier 239, the cam surfaces 238 in handle portion 236 are positioned within a recess, whereas the cam surfaces 238 in top carrier 239 protrude outward from top carrier 239 which matingly fits within the recess of handle portion 236.

More specifically, in a lowered position, the top landing area 238B of one of the components (handle portion 236 or top carrier 239) is received in the bottom landing area 238D of the other of the components (handle portion 236 or top carrier 239). Then, when rotated to such that the angled surfaces 238A of the two components (handle portion 236 and top carrier 239) slide over one another thereby raising the handle portion 236 with respect to the top carrier 239, the handle portion 236 is positioned in a fully raised position when the top landing area 238B of handle portion 236 is in engagement with the top landing area 238B of top carrier 239. The angled surfaces 238 cause the relative raising and lowering of the two components (handle portion 236 or top carrier 239) whereas the top landing area 238B and bottom landing area 238D provide rest areas where the two components (handle portion 236 or top carrier 239) will remain in place once in that position. To move from one position (raised or lowered) the handle portion 236 is rotated in the direction of arrow A. Handle portion 236 also includes a stop member 239D that hangs down a distance over top carrier 239 when handle portion 236 is engaged over top carrier 239. Stop member 239 terminates at its outward edges in flat or straight stop walls 239E. Stop walls 239E of handle member 236 engage the stop surfaces 239C of top carrier 239 in a fully raised position and a fully lowered position when the handle portion 236 is rotated along arrow A.

A threaded shaft 240 extends through the axis of rotation of handle portion 236 and top carrier 239. As the handle portion 236 is raised and lowered, this raises and lowers the threaded shaft 240 as is further described herein. The threaded shaft 240 extends downwardly through handle portion 236, top carrier 239 and through an opening in rail 220 and through the cam slots 86 in top plate 14. The top end of threaded shaft 240 includes a conventional head 242, such as a bolt head or screw head, which can be accessed and operated by the user when in use to tighten or loosen the cam lock 234.

A pair of alignment arms 244 extend downwardly from the lower arcuate surface of top carrier 239. Like threaded shaft 240, these alignment arms 244 extend downwardly therefrom through an opening in rail 220 and through the cam slots 86 in top plate 14. These alignment arms 244 extend on either side of threaded shaft 240, with a space positioned between their inner edges. This space provides room for threaded shaft 240 to extend there through. These alignment arms 244 have generally flat exterior faces 244A that extend in generally parallel to the height of top carrier 239 and perpendicular to the length of arms 239B. In this way, top carrier 239 maintains the alignment of cam lock 234 because the curved lower surface nestles in the arcuate recess 227 of rail 220 thereby aligning the top carrier 239 with the rail 220, and the alignment arms 244 fit within the cam slots 86 in top plate 14 thereby aligning the top carrier 239 with these cam slots 86.

A bottom carrier 245 is connected the bottom end of threaded shaft. Bottom carrier 245 has a collar portion 245A with an opening therein that receives threaded shaft 240. In one arrangement, the opening in collar portion 245A is threaded and threadably engages threaded shaft 240. In an alternative arrangement, collar portion 245A includes a pocket that receives a conventional nut 245B that threadably engages threaded shaft 240. In one arrangement, nut 245B is formed of a hardened metal thereby providing superior strength and wear resistance.

Bottom carrier 245 has a pair of alignment arms 246 which extend upwardly therefrom. These alignment arms 246 are similar to the alignment arms 244 that extend downwardly from top carrier 239. However, these alignment arms 246 fit within the space positioned between the inside edge of opposing alignment arms 244 of top keeper 239. In this way, as the threaded shaft 240 is tightened, the alignment arms 244 of top keeper 239 and the alignment arms 246 of bottom keeper 245 nest within one another thereby keeping themselves aligned with one another while allowing for vertical movement relative to one another, in the direction of arrow B. Bottom carrier 245 also includes a pair of generally flat exterior faces 245C that extend in generally parallel spaced relation to the height of bottom carrier 245. These faces 245C are positioned between collar portion 245A and alignment arms 246. When the alignment arms 246 of bottom carrier 245 are nested within the alignment arms 244 of top carrier 239 the faces 245C of bottom carrier 245 are in approximate parallel spaced alignment to the faces 244A of top carrier 239.

To assemble the cam locks 234, the fence assembly 25 is placed on the top plate 14 and the openings in the fence assembly 25 are aligned with the fence slots 84 in the top plate 14. The handle portion 236 is nested over the top carrier 239 such that the cam surfaces 238 of the handle portion 236 are in engagement with the cam surfaces 238 of the top carrier 239. Once aligned in this manner, threaded shaft is extended through the handle portion 236 and top carrier 239. Next, the curved surface 239A of top carrier 239 is nested in the arcuate recess 227 of fence assembly 25 and the threaded shaft 240 and alignment arms 244 are inserted through the fence assembly 25 and fence slots 28 in top plate 14. Next, the bottom carrier 245 is installed on the bottom of threaded shaft 240 on the bottom side of top plate 14 making sure that the threaded shaft 240 threadably engages the collar portion 245 and/or nut 245B if present. In this arrangement, care is taken to ensure that the alignment arms 246 of the bottom carrier 245 are aligned and received within the space between the alignment arms 244 of the top carrier 239. Once in this position, the threaded shaft 240 is tightened to the proper length such that the length formed by the top edge of collar portion 245A of bottom carrier 245 slides along the bottom surface of fence slots 84 in a lowered position (thereby allowing for movement of the fence assembly 25) and engage the bottom surface of fence slots 84 in a raised position (thereby preventing movement of the fence assembly 25).

To loosen or tighten the cam locks 234 the handle 236 is simply rotated upon shaft 240 along arrow A. As the handle 236 is rotated, the cam surface 238 in the bottom of handle 236 rotates upon the cam surface 238 of top keeper 239. Because top keeper 239 is nested within the arcuate recess 227 of rail 220 and alignment arms extend through the rail 220 and through the fence slots 84 of top plate 14 the top keeper 239 is prevented from rotating. This causes handle 236 to rotate upon non-rotating top keeper 239 and the mating cam surfaces 238 of handle 236 and top keeper 239 ramp over or down one another. When handle 236 is rotated in a first direction, this causes the threaded shaft 240 to be pulled up causing bottom keeper 245 to be pulled up, thereby tightening the cam lock 234 in place. When handle 236 is rotated in a second direction, opposite the first direction, this allows the threaded shaft 240 to be lowered allowing bottom keeper 245 to be lowered, thereby allowing for slack within the cam lock 234 allowing the fence assembly 25 to be adjusted within the fence slots 84.

One benefit of this arrangement, is that it keeps all the forces in a vertical alignment centered around the axis of rotation, or the center of threaded shaft 240. This provides a durable and robust design and long life for the component parts.

When adjusted properly, when the handle portion 236 is all the way in one direction, the arrangement provides enough slack to threaded shaft 240 that the top of bottom keeper 245 does not engage the bottom surface of top plate 14. In this position, the fence assembly 25 can be easily slid within fence slots 84 to the desired location as is indicated by measuring indicia 85.

Once the fence assembly 25 is in the desired position, the handle portions 236 are rotated in the opposite direction. In doing so, the cam surface 238 of handle portion 236 takes up the slack in threaded shaft 240 which pulls the top of bottom keeper 245 into tight engagement with the bottom surface of top plate 14. In this way, fence assembly 25 is locked in place.

While fence assembly 25 is shown in use with a pocket hole drilling machine system 10, the fence assembly 25 is not so limited. In contrast, the fence assembly 25 can be used with any woodworking device or other machine such as, for example, a table saw, drill press, miter saw, ban saw, router table, bench rest, radial arm saw, or the like.

Adjustable Stops:

At least one adjustable stop 248 is connected to fence assembly 25. Adjustable stop 248 is formed of any suitable size, shape and design. In one arrangement, adjustable stop 248 includes a main body 250 which is positioned within the space between the bottom surface of tab 230 and the top surface of top plate 14. In this position, the forward edge 252 of main body 250 is flush or recessed with respect to front surface of flange 232 or the front most surface of fence assembly 25. In this way, adjustable stop 248 does not interfere with use of the adjustable fence 25 when in place therein.

A locking member 254 extends outwardly from the rearward surface of main body 250 and is sized and shaped to frictionally engage and hold within T-slot 228 of rail 220. In one arrangement, locking member 254 is a threaded bolt or screw which can be tightened by the user through rotation of head 256 which is accessible from the front surface 252 of main body 250 through the opening present therein. To ensure that there is no interference, head 256 is flush or recessed with respect to the front surface 252 of main body 250.

A spring loaded stop arm 258 is pivotally connected at an axis 259 to one side of adjustable stop 248. In a static position, the spring loaded stop arm 258 extends outwardly from the front surface 252 of main body and extends outwardly from the front surface 232 of rail 220.

Spring loaded stop arm 258 can easily be forced into recession or flush alignment with the front surface 252 of main body 250 and the front surface 232 of rail 220 by sliding a work piece directly towards the rail 220. In doing so, the extended stop arm 258 is easily recessed out of the way and allows free use of the system 10.

However, while spring loaded stop arm 258 extends outwardly from main body 250 at an angle, when fully extended the end or stop face 260 of spring loaded stop arm 258 is designed to be perpendicular to the front surface 232 of rail 220. In this arrangement, the end or stop face 260 of the adjustable stop 248 and the front surface 232 of rail 220 provide two perpendicular surfaces to key the positioning of a work surface off thereof.

While stop arm 258 can be easily overcome by simply pushing a workpiece into the stop arm 258 thereby causing the stop arm 258 to retreat under the rail 220, stop arm 258 can be locked in place by sliding axis 259 within the oval opening 262 in main body 250. Sliding axis 259 within this opening 262 causes the spring loaded stop arm 258 to be maintained in a retracted position such that it is out of the way during drilling operations.

One, two, three or more adjustable stop 248 can be used in association with rail 220 to provide multiple stopping surfaces. Spring loaded stop arms 258 can be aligned to extend out of either end of the adjustable stop.

In Operation:

The adjustable fence assembly 25 is positioned at the right depth by aligning the adjustable fence assembly 25 within the fence slots 84 using the measuring indicia 85 on the top surface of the top plate 14. Once in position, the handle portions 236 are rotated into a tightening position, which pulls the bottom carrier 245 upward into engagement with the bottom surface of top plate 12. This locks the adjustable fence assembly 25 in the desired place.

Next, adjustable stops 248 are set to the desired location. The main body 250 of adjustable stops 248 are slid between the tab 230 and the top surface of top plate 14 with the locking member 254 within T-slot 228. Once set to the desired position, with the top efface 260 positioned at the spot where the edge of the work piece is to stop, the user tightens head 256 by accessing the font surface 252 of adjustable stop 248 and tightening it thereby locking adjustable stop 248 in place.

The depth stop assembly 162 is set by rotating actuating knob 166 until threaded shaft 164 extends the proper distance into cabinet 12. Once set to the proper depth, at which point the top surface of stop arm 158 engages the lower end of threaded shaft 164. Once in proper position, the locking nut 168 is tightened.

The clamping pad assembly 206 is set by rotating the actuating knob 210 until the clamp pad 216 is at the desired location. Once set to the proper depth, the locking nut 212 is tightened.

Once set to drill pocket holes in the proper position at the proper depth, the locking mechanism 58 is disengaged from the lock notch 156 in the actuating bracket 154 and the handle body 172 is free to operate.

A workpiece is placed on the top surface of the top plate 14 and insert plate 16. If the workpiece is to be aligned without the use of an adjustable stop 248, the work piece is slid directly into the spring loaded stop arm 258 which will cause it to rotate out of the way. If however the workpiece is to be aligned with the use of the adjustable stop 248, the workpiece is slid laterally against the front surface 232 of rail 220 until it engages the stop face 260 of adjustable stop 248.

Once the work piece is in place under the clamp assembly 18 and above the pocket hole drill bit 116, the user grabs the grip portion 174 of the handle body 172 and actuates the grip switch 176 and thumb button 177. This turns on the drill motor 138 while also releasing handle body 172 to be rotated downward.

As the handle body 172 is pulled downward, the axel shaft 90 rotates on axis 160 which pulls the bottom end of actuating bracket 154 rearward. This pulls the drill motor 138 rearward with the alignment guides 142 sliding along the guide rods 124 by pulling connecting rod 148. Simultaneously, the lower end of clamp arm 182 is pulled rearward by the actuating bracket 154 due to the pull of clamping springs 180, this pulls the bottom end of clamping arm 182 rearward, causing rotatable bearing 188 to roll upward on the forward edge of actuating bracket 154 while causing the upper end or forward end of clamping arm 182 to rotate on clamping axel 190 connected to tower 194. This rotation forces clamping pad 216 downward until it engages the top surface of the workpiece.

Once the clamping pad 216 engages the workpiece, and the handle body 172 continues to be pulled down, the roller bearing 188 dissociates or disengages from the front surface of actuating bracket 154 as the actuating bracket 154 continues to travel rearward. As the actuating bracket 154 continues to travel rearward, the drill bit 116 continues to move through the drill bit opening 112. This continues until the top surface of stop arm 158 engages the bottom end of depth stop assembly 162 at which point the drilling process is complete. The user then allows the handle to come up on its own return force generated by torsion spring 178, or alternatively the user moves the handle back to the starting position.

One advantage of this arrangement, is that the majority of the moving parts are within the cabinet 12. That is, due to axel shaft 90 being positioned at or below the surface of the top plate 14, the handle body 172 rotates exterior to the cabinet 12, as does a small part of the clamping arm 182. The remainder of the moving parts remain in the cabinet 12. In this way an improved and safer drilling machine is presented.

Method of Setting a Pocket Hole Drill Stop Collar:

Drill setting guide 400 and method is presented. Drill setting guide 400 is formed of any suitable size and shape and design. In one arrangement, as is shown, drill setting guide 400 has a flat and flush bottom surface 402 such that it can be positioned in flush engagement with the forward flat face 232 of rail 220 of fence assembly 25. Drill setting guide 400 has a plurality of indicia 404 thereon which correspond to a plurality of common screw lengths used in pocket hole joinery. These indicia 404, as examples, are broken down into four categories. First category is for screws that are ¾". The second category is for screws that are 1", 1¼" and 1½". The third category is for screws that are 2". The forth category is for screws that are 2½". Each of these categories are associated with a different platform 406 which raises a different distance above bottom surface 402. More specifically, the platform 406 for the first category for ¾" screws is the shortest, with the platform 406 for the second category for 1", 1¼" and 1½" screws being a distance taller, with the platform 406 for the third category for 2" screws being a distance taller, with the platform 406 for the fourth category for 2½" screws being the tallest. The top surface of platforms 406 are positioned in an angled relation to bottom surface 402. The top surface of platforms 406 are positioned in approximate perpendicular alignment to the axis of rotation of drill bit 116 when drill setting guide 400 is positioned flatly against the forward flat face 232 of rail 220 of fence assembly 25. A hole 408 is positioned in each platform 404 which is sized and shaped to receive the stepped portion of a stepped drill bit 408 (not shown), while the non-stepped portion of the drill bit engages the top surface of platform 406.

Using this new drill setting guide 400, the length of stepped drill bit 410 is set by first the proper platform 406 based on screw length using the indicia 404 on the drill setting guide 400. That is, if a 2" screw is being used, the platform 406 associated with the 2" indicia 404 is selected and is positioned in alignment with drill bit 116 as it exits the drill bit opening 112 in insert plate 16. Once in position, handle body 172 is pulled downward until the stepped portion of the drill bit 410 is received in hole 408 and the non-stepped portion of drill bit 41 engages platform 406 thereby stopping the drill bits progression. At this point, the actuating knob 166 of the depth stop assembly 162 is rotated until the threaded shaft 164 engages the top surface of the stop arm 158 of actuating bracket 154. In this way, the depth of a stepped drill bit 116 is set based on the length of screws used.

Quick Change of Drill Guides and Drill Bits:

The system presented allows for quick and easy replacement of drill bit guides 114 and drill bits 116. The tilting insert plate 16 allows for the first time, quick and easy axis to drilling assembly 22. This allows easy axis to guide block 120 and allows for easy replacement of drill bit guides by simply removing and replacing the fasteners. In addition, the quick change chuck 146 allows drill bits 116 to also be quickly and easily replaced. Furthermore, the use of the kickstand 70 allows for the insert plate to be propped up allowing for access to the interior of the cabinet 12 to change the drill bits 116 and drill bit guides 114. In addition, the storage compartment 46 allows for quick and easy storage of additional drill bit guides 114, and drill bits 116 that are used with the system 10.

From the above discussion it will be appreciated that the pocket hole drilling machine presented provides and offers many advantages over the prior art. Specifically, the pocket hole drilling machine shown and described herein improves upon the state of the art, is inexpensive, has an ergonomic design, has a minimum number of parts, has an intuitive design, is safer to operate than prior machines, has a minimum number of moving parts exterior to the cabinet, is efficient to use, is rugged and durable and is easily used on workpieces of various thicknesses, not to mention countless other advantages.

It will be appreciated by those skilled in the art that other various modifications could be made to the device without parting from the spirit and scope of this invention. All such modifications and changes fall within the scope of the claims and are intended to be covered thereby.

What is claimed is:

1. A drilling machine system, comprising:
   a cabinet;
   a top plate connected to the cabinet, the top plate and the cabinet forming an open interior;
   a drilling assembly positioned within the open interior;
   a bracket connected to the drilling assembly, the bracket rotatable on an axis of an axel shaft;
   a handle connected to the bracket and moveable between a non-drilling position and a drilling position;
   a torsion spring connected on a first end to the axel shaft;
   wherein the handle moves between the non-drilling position and the drilling position upon the axis of the axel shaft and the torsion spring applies a rotational force on the axis of the axel shaft;
   wherein the rotational force applied to the axis of rotation by the torsion spring is configured to move the handle to a non-drilling position from a drilling position.

2. The drilling machine system of claim 1 wherein a second end of the torsion spring remains stationary when the handle is moved between a non-drilling position and a drilling position thereby causing forces to be generated within the torsion spring when the first end of the torsion spring is rotated.

3. The drilling machine system of claim 1 wherein the torsion spring is positioned within the open interior of the cabinet below the top plate.

4. The drilling machine system of claim 1 further comprising a clamping arm connected to the bracket by a rotatable bearing.

5. The drilling machine system of claim 1 further comprising a clamping arm having at least one clamping spring that applies a force, wherein the clamping arm moves in a clamping direction.

6. A drilling machine, comprising:
   a cabinet;
   a top plate connected to the cabinet;
   the top plate formed of a single piece of material;
   an opening positioned within the top plate;
   an insert plate inserted within the opening;
   a drill bit opening positioned within the insert plate;
   wherein a drill bit extends and retracts through the drill bit opening at an angle to the top plate.

7. A drilling machine, comprising:
   a cabinet;
   a top plate connected to the cabinet;
   a drill motor positioned within the cabinet and connected to an actuating mechanism;
   a handle connected to the actuating mechanism;
   a clamping assembly connected to the actuating mechanism;
   wherein the cabinet is formed of a single monolithic molded piece having a plurality of walls;
   wherein the walls include a plurality of structural features therein that provide structural rigidity to the cabinet.

8. The drilling machine of claim 2 further comprising wherein the cabinet is formed of a material selected from the group consisting of: plastic, composite, fiberglass, UHMW material and a nylon material.

9. The drilling machine of claim 2 wherein the cabinet is formed by injection molding.

10. A drilling machine, comprising:
a cabinet;
a first plate connected to the cabinet;
the first plate having a pair of hinges;
the hinges having a socket portion, an adjustment member, and a cradle having an arcuate recess in its top surface;
a second plate connected to the first plate;
the second plate having a pair of connection members which are received by the cradle;
wherein the second plate is leveled with respect to the first plate by adjustment of the adjustment members.

11. The drilling machine of claim 10 wherein the connection members have an arcuate surface that is received by the arcuate recess of the cradle.

12. The drilling machine of claim 10 wherein the pair of hinges allows the second plate to tilt open thereby providing access to an open interior of the cabinet.

13. A drilling machine, comprising:
a cabinet;
a top plate connected to the cabinet;
a drill motor positioned within the cabinet and connected to a bracket;
a handle connected to the bracket;
a locking mechanism connected to the cabinet;
wherein the handle is movable between an open position and a closed position;
wherein movement of the handle causes movement of the bracket; and
wherein when the handle is pulled to a closed position a portion of the bracket is selectively engaged by the locking mechanism, thereby locking the handle in a closed position.

14. The drilling machine of claim 13 wherein when in a closed position a lock notch of the bracket extends through a portion of the cabinet.

15. A drilling machine, comprising:
a cabinet;
a plate connected to the cabinet;
a drill motor positioned within the cabinet and connected to an actuating mechanism;
a handle connected to the actuating mechanism;
a clamping assembly connected to the actuating mechanism; and
wherein the drill motor has a quick release chuck having a spring loaded collar to facilitate quick drill bit changes;
wherein the plate tilts with respect to the cabinet thereby providing access to the quick release chuck to facilitate removal and replacement of a drill bit held by the quick release chuck.

16. The drilling machine of claim 15 further comprising a removable drill bit guide positioned within a guide block connected to the plate.

17. A drilling machine, comprising;
a cabinet;
a top plate connected to the cabinet;
a drill motor positioned within the cabinet and connected to an actuating mechanism;
the actuating mechanism having a handle, wherein the handle is connected to an axel shaft;
the actuating mechanism having an actuating bracket connected to the axel shaft;
a clamping assembly connected to the actuating mechanism;
wherein the handle is moveable between an up position and a down position;
wherein when moved, the handle rotates upon an axis of rotation of the axle shaft; and
wherein the axis of rotation of the axle shaft is positioned at or below the top plate and within the cabinet.

18. A drilling machine system, comprising;
a cabinet;
a plate connected to the cabinet;
the plate having a drill bit opening therein;
a drill motor positioned within the cabinet and connected to an actuating mechanism;
the drill motor having a first drill bit connected thereto;
the drill motor slidable between a non-drilling position and a drilling position, wherein when in a drilling position the first drill bit extends partially through the drill bit opening;
a first drill bit guide connected to the plate and held in place using a fastener;
wherein the first drill bit guide is removable and replaceable by removing and replacing the fastener;
wherein the plate tilts with respect to the cabinet thereby providing access to the first drill bit and the first drill bit guide for removal and replacement of the first drill bit and the first drill bit guide.

19. The drilling machine system of claim 18 wherein the drill motor has a quick-detach chuck thereby allowing for quick replacement of the first drill bit.

20. The drilling machine system of claim 18 wherein the system includes a second drill bit and corresponding second drill bit guide, and a third drill bit and corresponding third drill bit guide, wherein the second drill bit and second drill bit guide are larger in diameter than the first drill bit and the first drill bit guide, and the third drill bit and third drill bit guide are larger in diameter than the second drill bit and drill bit guide.

21. A drilling machine system, comprising:
a first plate;
a second plate positioned within the first plate and connected to the first plate;
the second plate having a guide block formed as part of a bottom surface of the second plate, the guide block having a drill bit opening and a first guide rod opening and a second guide rod opening;
a drill bit guide positioned within the drill bit opening and held in place by a fastener;
a first guide rod positioned in the first guide rod opening, and
a second guide rod positioned in the second guide rod opening;
a drilling assembly connected to the first guide rod and the second guide rod;
wherein the drilling assembly slides along the first guide rod and the second guide rod in a drilling direction.

22. The drilling machine system of claim 21 wherein the second plate is hingedly connected to the first plate such that the second plate tilts with respect to the first plate.

23. The drilling machine system of claim 21 wherein the second plate fits within an opening of the first plate.

* * * * *

UNITED STATES PATENT AND TRADEMARK OFFICE
CERTIFICATE OF CORRECTION

PATENT NO. : 9,682,430 B2
APPLICATION NO. : 14/300488
DATED : June 20, 2017
INVENTOR(S) : Scott L. Clark Page 1 of 1

It is certified that error appears in the above-identified patent and that said Letters Patent is hereby corrected as shown below:

In the Claims

In Column 21, Lines 1-5, Claim 8 should be amended as provided below:
8. The drilling machine of claim 7 further comprising wherein the cabinet is formed of a material selected from the group consisting of: plastic, composite, fiberglass, UHMW material and a nylon material.

In Column 21, Lines 5-6, Claim 9 should be amended as provided below:
9. The drilling machine of claim 7 wherein the cabinet is formed by injection molding.

Signed and Sealed this
Twenty-fourth Day of July, 2018

Andrei Iancu
*Director of the United States Patent and Trademark Office*